US007292911B2

(12) United States Patent
Aoki et al.

(10) Patent No.: US 7,292,911 B2
(45) Date of Patent: Nov. 6, 2007

(54) LIVING ASSISTANCE SYSTEM

(75) Inventors: Katsuji Aoki, Nara (JP); Katsuhiro Kanamori, Nara (JP); Shusaku Okamoto, Kanagawa (JP); Yoshihiko Matsukawa, Nara (JP); Osamu Yamada, Nara (JP); Tomonobu Naruoka, Kanagawa (JP); Satoshi Sato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/346,538

(22) Filed: Feb. 2, 2006

(65) Prior Publication Data

US 2006/0195225 A1 Aug. 31, 2006

Related U.S. Application Data

(63) Continuation of application No. PCT/JP2004/011132, filed on Aug. 4, 2004.

(30) Foreign Application Priority Data

Aug. 4, 2003 (JP) ............................ 2003-285531

(51) Int. Cl.
*G06F 19/00* (2006.01)

(52) U.S. Cl. ....................... 700/245; 700/257; 700/259

(58) Field of Classification Search ................ 700/245, 700/257, 259
See application file for complete search history.

(56) References Cited

U.S. PATENT DOCUMENTS 6,971,854 B2 * 12/2005 Krakowski ............. 416/146 R

FOREIGN PATENT DOCUMENTS

| | | | |
|---|---|---|---|
| JP | 07-237159 | | 9/1995 |
| JP | 9-269810 | A | 10/1997 |
| JP | 2002-95072 | A | 3/2002 |
| JP | 2003-6532 | A | 1/2003 |
| JP | 2004-185607 | A | 7/2004 |
| JP | 2004-185612 | A | 7/2004 |

* cited by examiner

*Primary Examiner*—Thomas Black
*Assistant Examiner*—Marie A Weiskopf
(74) *Attorney, Agent, or Firm*—Harness, Dickey & Pierce, PLC

(57) ABSTRACT

In a robot operation terminal, a storage unit has a group-belonging article table that indicates articles belonging to each of groups. Upon receipt of operation information indicating an operation to be instructed to the robot through an input unit, when this operation information specifies a group as its operation subject, a conversion unit converts this group to articles belonging to the group in the operation information by reference to the group-belonging article table. Thus, the instruction of an operation is made simpler, thereby reducing the occurrence of a human error.

26 Claims, 23 Drawing Sheets

Fig.2

103

| ID | NAME | POSITION | ··· |
|---|---|---|---|
| 0001 | WATCH | 151,210 | ··· |
| 0002 | WALLET | 342,245 | ··· |
| 0003 | HANDKERCHIEF | 1045,1203 | ··· |
| 0004 | MUFFLER | 103,576 | ··· |
| 0005 | COAT | 2034,4567 | ··· |
| 0006 | UMBRELLA | 435,12 | ··· |
| 0007 | T-SHIRT | 3456,4325 | ··· |
| 0008 | SHIRT | 12,456 | ··· |
| 0009 | SNEAKER | 1204,569 | ··· |
| 0010 | GRAY SUIT | 1020,1002 | ··· |
| 0011 | DARK BLUE SUIT | 1020,1010 | ··· |
| 0012 | BROWN SUIT | 1020,1018 | ··· |
| 0013 | RED NECKTIE | 1030,1000 | ··· |
| 0014 | YELLOW NECKTIE | 1030,1005 | ··· |
| 0015 | GREEN NECKTIE | 1030,1010 | ··· |
| 0016 | DARK BLUE NECKTIE | 1030,1015 | ··· |
| : | : | : | : |

*Fig.3*

102

| ID | NAME | BELONGING ARTICLE OR GROUP (ID) |
|---|---|---|
| G0001 | VALUABLES | 0001,0002 |
| G0002 | COLD PREVENTION ARTICLES | 0004,0005 |
| G0003 | RAIN GEAR | 0006 |
| G0004 | COMPANY ATTENDANCE | 0003,G0001 |
| G0005 | ARTICLE TO BE WASHED | 0003,0007 |
| G0006 | WASHED ARTICLES | 0006,008 |
| G007 | SUIT | 0010,0011,0012 |
| G008 | NECKTIE | 0013,0014,0015,0016 |
| G009 | COMPANY ATTENDANCE CLOTHES | G007,G008 |
| : | : | : |

*Fig.4*

| SUBJECT ARTICLE OR GROUP | OPERATION CONTENTS |
|---|---|
| G0004 | TRANSFER TO POSITION (500, 500) |

| SUBJECT ARTICLE | CONTENTS OF OPERATION |
|---|---|
| 0003,0001,0002 | TRANSFER TO POSITION (500, 500) |

*Fig.8*

102A

| ID | NAME | BELONGING ARTICLE OR GROUP (ID) | BELONGING CONDITION |
| --- | --- | --- | --- |
| G0001 | VALUABLES | 0001 | — |
| | | 0002 | — |
| G0002 | COLD PREVENTION ARTICLES | 0004 | — |
| | | 0005 | — |
| G0003 | RAIN GEAR | 0006 | — |
| G0004 | COMPANY ATTENDANCE | 0003 | — |
| | | G0001 | — |
| | | G0002 | AIR TEMPERATURE: 10°C OR LESS |
| | | G0003 | IT IS RAINING NOW, OR IT WILL BE RAINY IN THE NEAR FUTURE. |
| : | : | : | : |

| SUBJECT ARTICLE | CONTENTS OF OPERATION |
|---|---|
| 0003,0001,0002,0004,0005 | TRANSFER TO POSITION (500, 500) |

*Fig. 12*

102B

| ID | NAME | BELONGING ARTICLE OR GROUP (ID) | SELECTION CONDITION |
|---|---|---|---|
| G0007 | SUIT | 0010 | SELECT 0010 ON MONDAY AND THURSDAY. SELECT 0011 ON TUESDAY AND FRIDAY. OTHERWISE SELECT 0012. HOWEVER, UPON SELECTION OF 0016 IN G0008, SELECT 0010 OR 0011 RANDOMLY, WITHOUT SELECTING 0011. |
| | | 0011 | |
| | | 0012 | |
| G0008 | NECKTIE | 0013 | SELECT ANY ONE OF 0013 TO 0016 RANDOMLY. HOWEVER, UPON SELECTION OF 0011 IN G0007, SELECT ANY ONE OF 0013 TO 0015, WITHOUT SELECTING 0016. |
| | | 0014 | |
| | | 0015 | |
| | | 0016 | |
| G0009 | COMPANY ATTENDANCE CLOTHES | G0007 | NONE |
| | | G0008 | |
| : | : | : | : |

*Fig.14*

| SUBJECT ARTICLE OR GROUP | CONTENTS OF OPERATION |
|---|---|
| G0009 | TRANSFER TO POSITION (2000, 2000) |

*Fig.15*

| SUBJECT ARTICLE | CONTENTS OF OPERATION |
|---|---|
| 0011,0013 | TRANSFER TO POSITION (2000, 2000) |

Fig. 17

102C

| ID | NAME | BELONGING ARTICLE OR GROUP (ID) | CONTENTS OF OPERATION | EXECUTION CONDITION |
|---|---|---|---|---|
| G0005 | CLOTHES | 0007 | NONE | — |
| | | 0008 | NONE | — |
| G0006 | WASHED ARTICLE | G0005 | TRANSFER TO DRYING PLACE AT POSITION (1000, 1000) | IT IS NOT RAINY NOW, AND IT WILL NOT BE RAINY IN THE NEAR FUTURE. |
| | | | TRANSFER TO CLOTHES DRYER AT POSITION (2000, 2000) | IT IS RAINY NOW, AND IT WILL BE RAINY IN THE NEAR FUTURE. |
| | | 0009 | TRANSFER TO SHADE-DRYING PLACE AT POSITION (3000, 3000) | NONE |
| : | : | : | : | : |

*Fig. 19*

| SUBJECT ARTICLE OR GROUP | CONTENTS OF OPERATION |
|---|---|
| G0006 | TRANSFER TO POSITION (500, 500) |

*Fig. 20*

| SUBJECT ARTICLE | CONTENTS OF OPERATION |
|---|---|
| 0007 | TRANSFER TO DRYING PLACE AT POSITION (1000, 1000) |
| 0008 | TRANSFER TO DRYING PLACE AT POSITION (1000, 1000) |
| 0009 | TRANSFER TO SHADE-DRYING PLACE AT POSITION (3000, 3000) |

102D

| ID | NAME | OPERATION STARTING CONDITION | BELONGING ARTICLE OR GROUP (ID) |
|---|---|---|---|
| G0005 | CLOTHES | NONE | 0007 |
| | | | 0008 |
| G0007 | ARTICLE TO BE WASHED | TIME 18:00 | G0005 |
| | | | 0009 |
| : | : | : | : |

*Fig.24*

| SUBJECT ARTICLE OR GROUP | CONTENTS OF OPERATION |
|---|---|
| G0007 | TRANSFER TO CLOTHES WASHER AT POSITION (4000, 4000) |

*Fig.25*

| SUBJECT ARTICLE OR GROUP | CONTENTS OF OPERATION |
|---|---|
| 0007,0008,0009 | TRANSFER TO CLOTHES WASHER AT POSITION (4000, 4000) |

*Fig.27*

102E

| ID | NAME | OPERATION COMPLETION CONDITION | BELONGING ARTICLE OR GROUP (ID) |
|---|---|---|---|
| G0001 | VALUABLES | NONE | 0001 |
| | | | 0002 |
| G0004 | COMPANY ATTENDANCE | IF TRAFFIC JAM IS NOT HEAVY, 7:00, AND IF IT IS HEAVY, 6:30. | 0003 |
| | | | G0001 |
| : | : | : | : |

| SUBJECT ARTICLE OR GROUP | CONTENTS OF OPERATION |
|---|---|
| 0001,0002,0003 | TRANSFER TO POSITION (500, 500) |

LIVING ASSISTANCE SYSTEM

This is a continuation application of International Application No. PCT/JP2004/011132, filed Aug. 4, 2004.

BACKGROUND OF THE INVENTION

The present invention relates to a living assistance system that gives instructions to a robot to operate an article in a living space such as habitation space in a home and the like so that the article is operated by using the robot so as to assist living, and in particular to improvements of processes of operation information that is inputted upon instructions of the operation of the article in the living assistance system.

The robot used for carrying out operations on an article has been utilized in many industrial fields, such as holding and transferring operations for parts in an automatic product-assembling line in factories and transferring and managing operations for stored products in automated warehouses. At present, the robot has come to be used not only in industrial fields, but also in general homes where people live. With respect to the domestic robot, for example, a so-called housekeeping assistance robot that puts away domestic articles or the like has been used.

Japanese Unexamined Patent Publication No. 07-237159 has disclosed a technique used for inputting operation information to a robot that loads articles on a pallet. In this technique, a virtual article diagram that indicates the actual state is displayed on a monitor. Here, an operator who inputs operation information is allowed to input operation information to the robot through intuitive operations by using a two-dimensional pointing device such as a touch panel, while viewing the virtual article diagram displayed on the monitor. With this arrangement, any operator, who is not necessarily a skilled operator, can input operation information with ease.

In this manner, the technique disclosed in Japanese Unexamined Patent Publication No. 07-237159 is also applicable to a domestic robot upon inputting operation information, and expected to provide the same effects.

However, with respect to the domestic robot, it is necessary to make the inputting operation of operation information easier by taking the application state of the robot in home into consideration as well as by incorporating general common sense on the social life thereto.

For example, suppose that the operations for "collecting articles required upon company attendance" are instructed to a robot. In this case, the subject articles include many items, such as a bag, a handkerchief, a cellular phone, and a wallet, and since the company attendance is made almost every day on week days, it is necessary to give the corresponding operation instructions on the many articles every day frequently.

In the technique of Japanese Unexamined Patent Publication No. 07-237159, however, with respect to the plurality of articles, the same operation instructions need to be inputted one by one in the same manner every time. In addition to the company attendance, there are many circumstances in home, in which operation instructions for many articles need to be frequently given.

Moreover, upon instructing operations "for collecting articles required upon company attendance" to a robot, in addition to articles normally used, subject articles are changed depending on changes in conditions such as air temperature and weather, in such a manner that when it is cold, cold prevention articles such as a coat and a muffler are required and when it is raining, rain gear such as an umbrella or a rain coat is required. However, in the technique disclosed in Japanese Unexamined Patent Publication No. 07-237159, an operator who gives instructions to a robot needs to respectively input articles that are operation subjects, while taking conditions such as weather and air temperature into consideration. The inputting operations of this type are complicated and tend to cause a human error such as a failure to specify necessary articles.

Alternatively, suppose that the operations "for transferring washed articles to a place for drying" are instructed to a robot. In this case, the transfer end that is a content of the operation is changed depending on the conditions of weather in such a manner that when it is fine, the transfer end is a clothes-drying place, and that when it is rainy, the transfer end is a clothes dryer. However, in the technique disclosed in Japanese Unexamined Patent Publication No. 07-237159, an operator who gives instructions to a robot needs to respectively input articles that are operation subjects while taking conditions such as weather into consideration.

As described above, even when the technique of Japanese Unexamined Patent Publication No. 07-237159 is simply applied to a domestic robot, the inputting processes of operation information used for instructing operations of articles to the robot become extremely complicated, and issues tend to arise in which a human error such as a failure in specifying articles and a mistake in the operation starting timing occur.

In order to solve the above-mentioned issues, an object of the present invention is to provide a living assistance system that gives instructions to a robot to operate an article in a living space such as a home so that the article is operated by using the robot so as to assist life, and makes it possible to simplify the article operation instructions to be given to the robot and consequently to reduce the occurrence of a human error.

SUMMARY OF THE INVENTION

In order to achieve the above-mentioned object, the present invention has the following arrangements.

In accordance with one aspect of the present invention, there is provided a living assistance system, which instructs a robot to carry out operations on articles so as to assist life, comprising:

a storage unit for, with respect to a group that is one or a plurality of collections of articles, storing group-belonging article information that indicates articles that belong to the group;

an input unit through which operation information that indicates an operation of an article that is instructed to the robot is inputted; and a conversion unit for, referring to the group-belonging article information that relates to a group specified as an operation subject by the operation information inputted to the input unit and is stored in the storage unit, converting the group of operation information to articles belonging to the group, and outputting article operation instructing information that instructs operations of the converted articles to the robot, and wherein based upon the article operation instructing information outputted by the conversion unit, the living assistance system instructs operations of the article to the robot so as to carry out living assistance processes.

In accordance with this invention, when the user specifies a group as an operation subject in the operation information, this group is automatically converted to articles belonging to this group based upon the group-belonging article information. For this reason, for example, even in the case when there are many articles that form operation subjects, these articles can be specified as a group collectively. Therefore, the user is allowed to extremely easily carry out operation instructions with a plurality of articles as subjects; therefore, it becomes possible to avoid complicated inputting operations of operation information even in the case of operations to be carried out frequently, and consequently to reduce the occurrence of human errors.

Moreover, with respect to the group specified by operation information, in the case when a belonging-condition is attached to an article belonging to the group in the group-belonging article information, upon converting the group to articles, any article, which fails to satisfy the belonging-condition based upon condition information received from a sensing unit, may be deleted.

In accordance with the present invention, when the user specifies a group as an operation subject in the operation information, this group is automatically converted to articles belonging to this group; however, when a belonging-condition of an article is indicated in group-belonging article information, the conversion is carried out on only those articles that satisfy the belonging-condition based upon the condition information received from the sensing unit. For this reason, for example, when a condition relating to the air temperature or weather is specified in the group-belonging article information as a belonging-condition, such an operation can be automatically carried out in which, for example, upon "company attendance", only when the air temperature is low, "cold prevention articles" are prepared, or only when the future weather is expected to be rainy, "rain gear" is prepared. This arrangement eliminates the user's necessity of having to particularly take account of, for example, the air temperature, the weather, and the like so that since it is only necessary for the user to always instruct the same operation, the convenience of the system is improved.

Furthermore, with respect to the group specified by operation information, in the case when a selection condition of an article belonging to the group is indicated in the group-belonging article information, the group may be converted to an article selected based upon the selection condition.

In accordance with the present invention, when a group is specified as an operation subject in the operation information, this group is automatically converted to articles belonging to this group; however, when a selection condition of an article is indicated in the group-belonging article information, the conversion is carried out on only those articles that are selected based upon the selection condition. For this reason, for example, by specifying a random selection or a relationship with another article in the group-belonging article information as the selection condition, such an operation can be automatically carried out in which, upon "company attendance", "a necktie" can be randomly selected, or "a necktie" can be selected according to "a suit". This arrangement eliminates the user's necessity of having to consider, for example, coordinates of clothes so that since it is only necessary for the user to always instruct the same operation, the convenience of the system is improved.

With respect to the group specified by operation information, in the case when contents of operation and its execution condition are indicated in the group-belonging article information, if the condition information received from the sensing unit satisfies the execution condition, the specified contents of operation may be substituted by the contents of operation indicated in the group-belonging article information.

In accordance with the present invention, a group is specified as an operation subject in operation information, this group is automatically converted to articles belonging to this group; however, in the case when contents of operation and its execution condition are indicated in group-belonging article information, if the condition information received from the sensing unit satisfies the execution condition, the specified contents of operation are substituted by the contents of operation indicated in the group-belonging article information. For this reason, for example, in the case when "transfer to a clothes dryer" and "the weather is rainy" are specified as the contents of operation and its execution condition in the group-belonging article information, upon carrying out "washing" processes, even in the case when the contents of operation are specified as "transfer to a drying place", if the weather is rainy, the contents of operation are automatically substituted by "transfer to a clothes dryer". This arrangement eliminates the user's necessity of having to particularly take account of, for example, the weather or the like so that since it is only necessary for the user to always instruct the same operation, the convenience of the system is improved.

In accordance with the present invention, since, upon giving instructions for an operation to a robot, the user can specify articles forming the operation subjects as a group collectively, it is possible to extremely easily give operation instructions with a plurality of articles as subjects. Therefore, it becomes possible to prevent inputting processes of operation information from becoming complex, and consequently to reduce human errors. Moreover, upon conversion of the operation information, by adding a belonging-condition or a selection condition of the subject article, an execution condition of the contents of operation, or the like thereto, it becomes possible to eliminate the user's time-consuming tasks, such as taking the air temperature and the weather into consideration and taking account of coordinates of clothes; therefore, since it is only necessary for the user to always instruct the same operation, the convenience of the system is improved.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a view that shows one example of information stored in an article information table in each of embodiments of the present invention;

FIG. 3 is a view that shows one example of group-belonging article information in accordance with the first embodiment of the present invention;

FIG. 4 is a view that shows operation information prior to conversion in an article operation system that is one example of a living assistance system in accordance with the first, second, and sixth embodiments of the present invention;

FIG. 8 is a view that shows one example of group-belonging article information in accordance with the second embodiment of the present invention;

FIG. 12 is a view that shows one example of group-belonging article information in accordance with the third embodiment of the present invention;

FIG. 14 is a view that shows operation information before conversion in accordance with the third embodiment of the present invention;

FIG. 15 is a view that shows operation information after conversion in accordance with the third embodiment of the present invention;

FIG. 17 is a view that shows one example of group-belonging article information in accordance with the fourth embodiment of the present invention;

FIG. 19 is a view that shows operation information before conversion in accordance with the fourth embodiment of the present invention;

FIG. 20 is a view that shows operation information after conversion in accordance with the fourth embodiment of the present invention;

FIG. 24 is a view that shows operation information before conversion in accordance with the fifth embodiment of the present invention;

FIG. 25 is a view that shows operation information after conversion in accordance with the fifth embodiment of the present invention;

FIG. 27 is a view that shows one example of group-belonging article information in accordance with the sixth embodiment of the present invention;

DETAILED DESCRIPTION OF THE PREFERRED EMBODIMENTS

Figure 1:
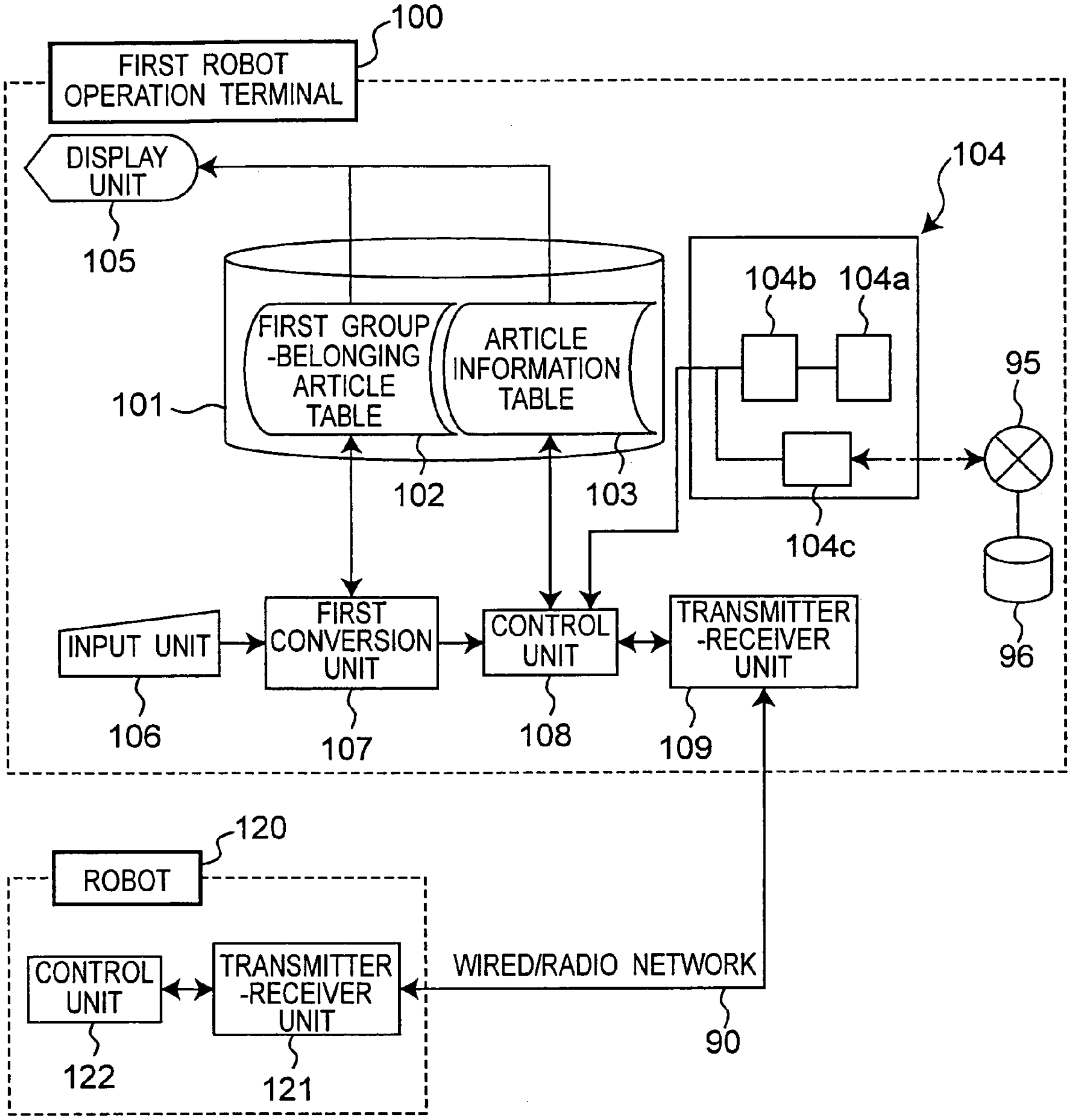
FIG. 1 is a block diagram that shows an article operation system that is one example of a living assistance system in accordance with a first embodiment of the present invention.

Before the description of the present invention proceeds, it is to be noted that like parts are designated by like reference numerals throughout the accompanying drawings.

Prior to explaining embodiments of the present invention, the following description will discuss various aspects thereof.

According to a first aspect of the present invention, there is provided a living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the group; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance.

According to a second aspect of the present invention, there is provided the living assistance system according to the first aspect, wherein the group of the group-belonging article information includes another group that belongs to the corresponding group, and is one or a plurality of collections of articles.

According to a third aspect of the present invention, there is provided the living assistance system according to the first aspect, wherein the group-belonging article information includes a belonging-condition that is attached to at least one article of the articles belonging to the group, further comprising:

a second sensing unit for acquiring belonging-condition information used for determining whether or not the belonging-condition is satisfied, and outputting the acquired condition information to the conversion unit, wherein upon converting the group to the article belonging to the group, when the belonging-condition of the article of the group specified by the operation information is not satisfied based upon the belonging-condition information acquired by the second sensing unit, the conversion unit deletes the article.

According to a fourth aspect of the present invention, there is provided the living assistance system according to the first aspect, wherein: the group-belonging article information includes a selection condition used for selecting one article from all or one portion of the articles belonging to the group, together with the plurality of articles belonging to the group; and with respect to the group specified by the operation information, when the selection condition is included in the group-belonging article information, the conversion unit converts the group to the article selected based upon the selection condition in the operation information.

According to a fifth aspect of the present invention, there is provided the living assistance system according to the fourth aspect, further comprising:

a second sensing unit for acquiring selection condition information used for carrying out a selection process based upon the selection condition, and outputting the acquired selection condition information to the conversion unit;

wherein upon receipt of the selection condition information from the second sensing unit, the conversion unit selects the article by reference to the selection condition information.

According to a sixth aspect of the present invention, there is provided the living assistance system according to the first aspect, wherein the group-belonging article information includes contents of operation and an execution condition thereof attached to the article belonging to the group, the system further comprising: a second sensing unit for acquiring condition information used for determining whether or not the execution condition is satisfied, and outputting the acquired condition information to the conversion unit, wherein when the condition information outputted from the second sensing unit satisfies the execution condition attached to the article belonging to the group specified by the operation information, the conversion unit converts the operation contents specified by the operation information to the operation contents indicated by the group-belonging article information.

According to a seventh aspect of the present invention, there is provided the living assistance system according to the first aspect, wherein the group-belonging article information includes an operation starting condition of the group, the system further comprising: a second sensing unit for acquiring condition information used for determining whether or not the operation starting condition is satisfied, and outputting the acquired condition information to the conversion unit, wherein upon determining that the condition information outputted from the second sensing unit satisfies the operation starting condition of the group specified by the operation information, the conversion unit starts converting the operation information.

According to an eighth aspect of the present invention, there is provided the living assistance system according to the first aspect, wherein the group-belonging article information includes an operation completion condition of the group, the system further comprising: a second sensing unit for acquiring condition information used for determining a timing in which the operation completion condition is satisfied, and outputting the acquired condition information to the conversion unit, wherein, in the timing in which the condition information outputted from the second sensing unit satisfies the operation completion condition of the group specified by the operation information, the conversion unit starts converting the operation information.

According to a ninth aspect of the present invention, there is provided the living assistance system according to the first aspect, wherein the article attribute information includes as an attribute of the article at least one element selected from the group consisting of type, weight, volume, and material.

According to a 10th aspect of the present invention, there is provided the living assistance system according to the third aspect, wherein: the second sensing unit acquires as the condition information at least one element selected from the group consisting of attribute information of the article, time and date, meteorological conditions or traffic information at presence or in future, an action schedule of an user of the living assistance system, type, number, total weight, or total volume of articles belonging to the group, and time elapsed after joining to the group, and information indicating start or completion of a control system independent from the living assistance system.

According to an 11th aspect of the present invention, there is provided the living assistance system according to the fifth aspect, wherein: the second sensing unit acquires as the condition information at least one element selected from the group consisting of attribute information of the article, time and date, meteorological conditions or traffic information at presence or in future, an action schedule of an user of the living assistance system, type, number, total weight, or total volume of articles belonging to the group, and time elapsed after joining to the group, and information indicating start or completion of a control system independent from the living assistance system.

According to a 12th aspect of the present invention, there is provided the living assistance system according to the sixth aspect, wherein: the second sensing unit acquires as the condition information at least one element selected from the group consisting of attribute information of the article, time and date, meteorological conditions or traffic information at presence or in future, an action schedule of an user of the living assistance system, type, number, total weight, or total volume of articles belonging to the group, and time elapsed after joining to the group, and information indicating start or completion of a control system independent from the living assistance system.

According to a 13th aspect of the present invention, there is provided the living assistance system according to the seventh aspect, wherein: the second sensing unit acquires as the condition information at least one element selected from the group consisting of attribute information of the article, time and date, meteorological conditions or traffic information at presence or in future, an action schedule of an user of the living assistance system, type, number, total weight, or total volume of articles belonging to the group, and time elapsed after joining to the group, and information indicating start or completion of a control system independent from the living assistance system.

According to a 14th aspect of the present invention, there is provided the living assistance system according to the eighth aspect, wherein: the second sensing unit acquires as the condition information at least one element selected from the group consisting of attribute information of the article, time and date, meteorological conditions or traffic information at presence or in future, an action schedule of an user of the living assistance system, type, number, total weight, or total volume of articles belonging to the group, and time elapsed after joining to the group, and information indicating start or completion of a control system independent from the living assistance system.

Referring to the drawings, the following description will discuss embodiments of the present invention.

First Embodiment

FIG. 1 is a block diagram that shows an article operation system as one example of a living assistance system in accordance with a first embodiment of the present invention. In FIG. 1, reference numeral 100 represents a first robot operation terminal, and 120 represents a robot, and these transmit information to each other through a radio or wired network 90. In the first embodiment and the following embodiments, the robot 120 is supposed to be used in a home, as one example of the living environment.

The first robot operation terminal 100 is provided with: a storage unit 101 that has a first group-belonging article table 102 and an article information table 103; a sensing unit 104 which is connected to the storage unit 101 through a control unit 108, for detecting an article located within a working environment of the robot 120 and its attribute information so as to update the article information table 103 through the control unit 108; a display unit 105 that is connected to the storage unit 101 and constituted by, for example, a liquid crystal display; an input unit 106 that is constituted by, for example, a two-dimensional pointing device and used for inputting operation information indicating an operation that is instructed to the robot 120 by the user; a first conversion unit 107 which is connected to the input unit 106 and the storage unit 101, for converting the operation information inputted to the input unit 106 by reference to the first group-belonging article table 102; a control unit 108 which is connected to the first conversion unit 107 and the storage unit 101, for generating a control command for the robot 120 based upon the operation information that has been converted and outputted by the first conversion unit 107; and a transmitter-receiver unit 109 which is connected to the control unit 108, for carrying out transmitting and receiving processes of communication data. Since the sensing unit 104 is connected to the article information table 103 through the control unit 108, it is possible to prevent the sensing unit 104 from updating information of the article information table 103 during an operation in the first conversion unit 107 or the control unit 108.

Moreover, the robot 120 is provided with a transmitter-receiver unit 121 which is connected to the transmitter-receiver unit 109 through a radio or wired network 90, for carrying out transmitting and receiving processes of communication data so as to make information mutually communicatable; and a control unit 122 which is connected to the transmitter-receiver unit 121, for carrying out operation controls of the robot 120.

FIG. 2 is a view that shows one example of information (article attribute information) stored in the article information table 103. With respect to each of articles present in a home, FIG. 2 shows ID information like an ID number and a name, used for identifying individual articles, and information relating to attributes, such as the existing position thereof (a position specified by coordinates of two orthogonal axes, for example, X-axis and Y-axis). In addition to the existing position, the attributes of the article include, for example, the type, weight, volume, material, and the presence or absence of stain.

The information stored in the article information table 103 is registered/updated by the sensing unit 104 under control of the control unit 108 through the control unit 108. The sensing unit 104 detects the articles located within a working environment (in this case, home) of the robot 120 and attribute information thereof.

With respect to the technique used for detecting articles located within the working environment and attribute information thereof by using the sensing unit 104, at present, various techniques have been known. One of these is a method utilizing cameras. For example, the working environment in which no articles are located is preliminarily photographed, and by using this image, an article is extracted by an operation unit (for example, operation unit 104*b*, which will be described later) from the current image photographed by a camera (for example, a camera 104*a*, which will be described later) through a background difference method. Based on the camera positional information and the like, the position of the extracted article is specified through geometrical conversion. Moreover, the type of this article may be specified by using a pattern matching technique. In addition to cameras, various sensors utilizing physical, optical, electrical, or physical properties, such as pressure sensors, distance sensors, or temperature sensors, may be used to detect the object and also detect the attributes thereof such as weight, volume, material, or degree of stain. In this case, the sensing unit 104 may be constituted by cameras or sensors, or by a receiving unit (receiving means or device) for conducting a receiving process of information obtained by the cameras or sensors through a wired communication or a radio communication. Therefore, as one example, the sensing unit 104 is constituted by a camera (image sensor) 104*a* for picking up a current image of the working environment including an article, and an operation unit 104*b* which is connected to the camera 104*a* and is available to carry out the background difference method by utilizing the current image picked up by the camera 104*a* and the image of the working environment that has been preliminarily picked up when no article is located to output the results of the operation to the storage unit 101. Here, the current time may be detected by a watch.

Currently, by the developments of POS systems (Point-Of-Sales System), information for specifying an article, such as barcodes, is added to various articles. When the barcode indicates information, such as JAN code (abbreviation of Japanese Article Number Code, one type of European Article Number), controlled and managed by a predetermined organization such as the Distribution Systems Research Institute, the attribute information of the article can be obtained by accessing a data base 96 of the corresponding organization through, for example, the Internet 95. In this case, the sensing unit 104 only requires functions to receive the barcode information obtained through a camera or a sensor 104*a* by the transmitter-receiver unit 104*c*, and based upon the received barcode information, to allow the transmitter-receiver unit 104*c* to access the Internet 95 so that attribute information of the article corresponding to the barcode information is acquired. Moreover, in the future, it is expected to use an identifying means or device, such as two-dimensional barcodes or RF tags, capable of storing a more amount of information than barcodes. In this case, the attribute information of the article may be directly obtained from this identifying means or device, and the sensing unit 104 only needs to have a function for receiving information obtained from the identifying means or device by a sensor.

FIG. 3 is a view that shows one example of information (group-belonging article information) stored in the first group-belonging article table 102. In FIG. 3, with respect to a group(s), that is, one or a plurality of collections of articles, ID information such as ID numbers and names used for individually identifying the groups and articles belonging to the group(s) are shown. Here, "G" is added to the leading portion of the ID information of the group(s). Each article is specified by ID information as indicated by the article information table 103 shown in FIG. 2. Moreover, with respect to some of the groups, articles belonging to the group(s) are specified by ID information of another group. For example, it is indicated that an article "0003: handkerchief" and a group "G0001: valuables" belong to a group "G0004: company attendance".

The display device 105 graphically displays contents of a first group-belonging article table 102 and an article information table 103 by using, for example, icons or actual images of articles. With this arrangement, the articles and groups that can be used as subjects to be operated are shown to the operator of the robot 120.

The operator of the robot 120 inputs operation information including subjects to be operated and the contents of operations through the input unit 106. The input unit 106, formed by, for example, a two-dimensional pointing device, may be prepared as any device as long as it allows the input of operation information including subjects to be operated and the contents of operations.

FIG. 4 is a view that shows one example of operation information. In FIG. 4, group "G0004: company attendance" is specified as the subject to be operated and "transferring to position (500, 500)" is specified as the content of operation.

Figures 5, 6:
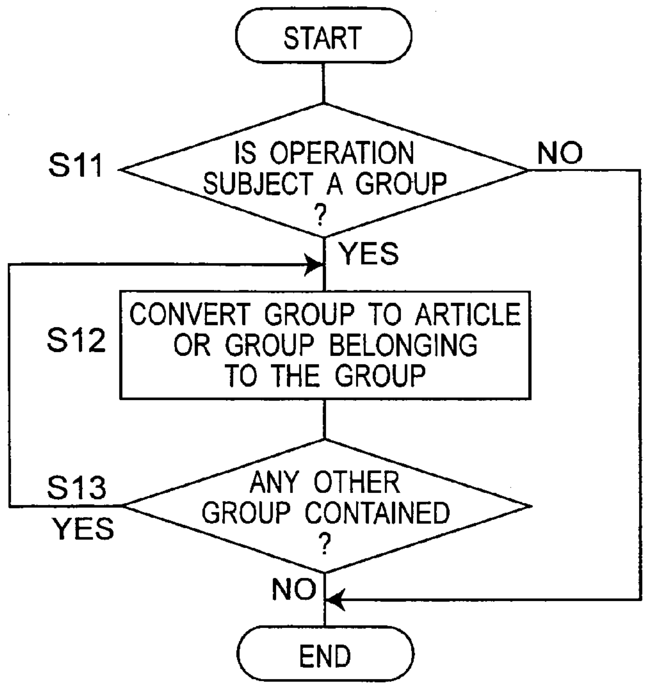
FIG. 5 is a flow chart that shows conversion processes in accordance with the first embodiment of the present invention.
FIG. 6 is a view that shows operation information after conversion in accordance with the first embodiment of the present invention.

Referring to a flow chart of FIG. 5, the following description will discuss the operation of the first conversion unit 107 of FIG. 1. Here, operation information as shown in FIG. 4 is supposed to be given to the first conversion unit 107 through the input unit 106.

First, at step S11, the first conversion unit 107 determines whether or not the operation subject indicated by operation information is a group. This determination is easily made by whether or not the leading character of the ID information of the operation subject is "G". In this case, since the ID information of the operation subject is "G0004" (Yes, at step S11), the sequence proceeds to step S12. When the leading character of the ID information of the operation subject is not "G", that is, when the operation subject is not a group, but an article (No, at step S11), the first conversion unit 107 does not convert the operation information, and completes the process of the first conversion unit 107.

Next, at step S12, referring to the first group-belonging article table 102 shown in FIG. 3, the first conversion unit 107 converts the group forming the operation subject to article(s) or a group(s) belonging to the corresponding group. In the above-mentioned example, FIG. 3 shows that an article "0003: handkerchief" and a group "G0001: valuables" belong to the group "G0004: company attendance". Therefore, the first conversion unit 107 converts the group "G0004: company attendance" to the article "0003: handkerchief" and the group "G0001: valuables" in the operation information. Thereafter, the sequence proceeds to step S13.

At step S13, the first conversion unit 107 determines whether or not the operation information contains any other group as the operation subject. In this case, since another group "G0001: valuables" is contained (Yes, at step S13), the sequence returns to step S12. If no other group is contained (No, at step S13), the first conversion unit 107 completes the process by the first conversion unit 107.

At step S12, again, referring to the first group-belonging article table 102 shown in FIG. 3, the first conversion unit 107 converts the group "G0001: valuables" to an article "0001: watch" and an article "0002: wallet". Then, at step S13, the first conversion unit 107 again determines whether or not the operation information contains any other group as the operation subject, and since no other group is contained (No, at step S13), the first conversion unit 107 completes the process by the first conversion unit 107.

As a result of the above-mentioned operation, the operation information of FIG. 4 is changed as shown in FIG. 6. In other words, the article "0003: handkerchief", article "0001: watch", and article "0002: wallet" are specified as the operation subjects.

The operation information as shown in FIG. 6, converted and outputted by the first conversion unit 107, is given to the control unit 108. Based upon the operation information thus given, the control unit 108 generates operation commands for the robot 120 by reference to the article information table 103. For example, based upon the operation information shown in FIG. 6, the following commands are generated:

1) Move to position (1045, 1203) of "0003: handkerchief".
2) Hold the article.
3) Transfer to target position (500, 500).
4) Release the article.
5) Move to position (151, 210) of "0001: watch".
6) Hold the article.
7) Transfer to target position (500, 500).
8) Release the article.
9) Move to position (151, 210) of "0002: wallet".
10) Hold the article.
11) Transfer to target position (500, 500).
12) Release the article.

The above-mentioned commands 1) to 12), generated by the control unit 108, are inputted to the control unit 122 of the robot 120 through the transmitter-receiver unit 109, the radio or wired network 90, and the transmitter-receiver unit 121. Based upon the inputted commands 1) to 12), the control unit 122 operates the robot 120 so that the operations in which the article "0003: handkerchief", the article "0001: watch", and the article "0002: wallet" are held by the robot 120 and "transferred to the target position (500, 500)" are executed.

As described above, according to the first embodiment, when the inputted operation information indicates a group as the operation subject, the first conversion unit 107 automatically converts the corresponding group of the operation subject to articles belonging to the group of the operation subject by reference to the first group-belonging article table 102. For this reason, even when there are a plurality of operation subject articles, the operator of the robot 120 is allowed to input the contents of the operation in a manner so as to collectively specify them as a group; therefore, even under a circumstance in which conventionally, operation instructions have to give frequently for each of articles, the first embodiment of the present invention makes it possible to easily execute the operation instructions. Therefore, it becomes possible to prevent inputting processes of operation information from becoming complex, and consequently to reduce human errors.

Second Embodiment

Figure 7:
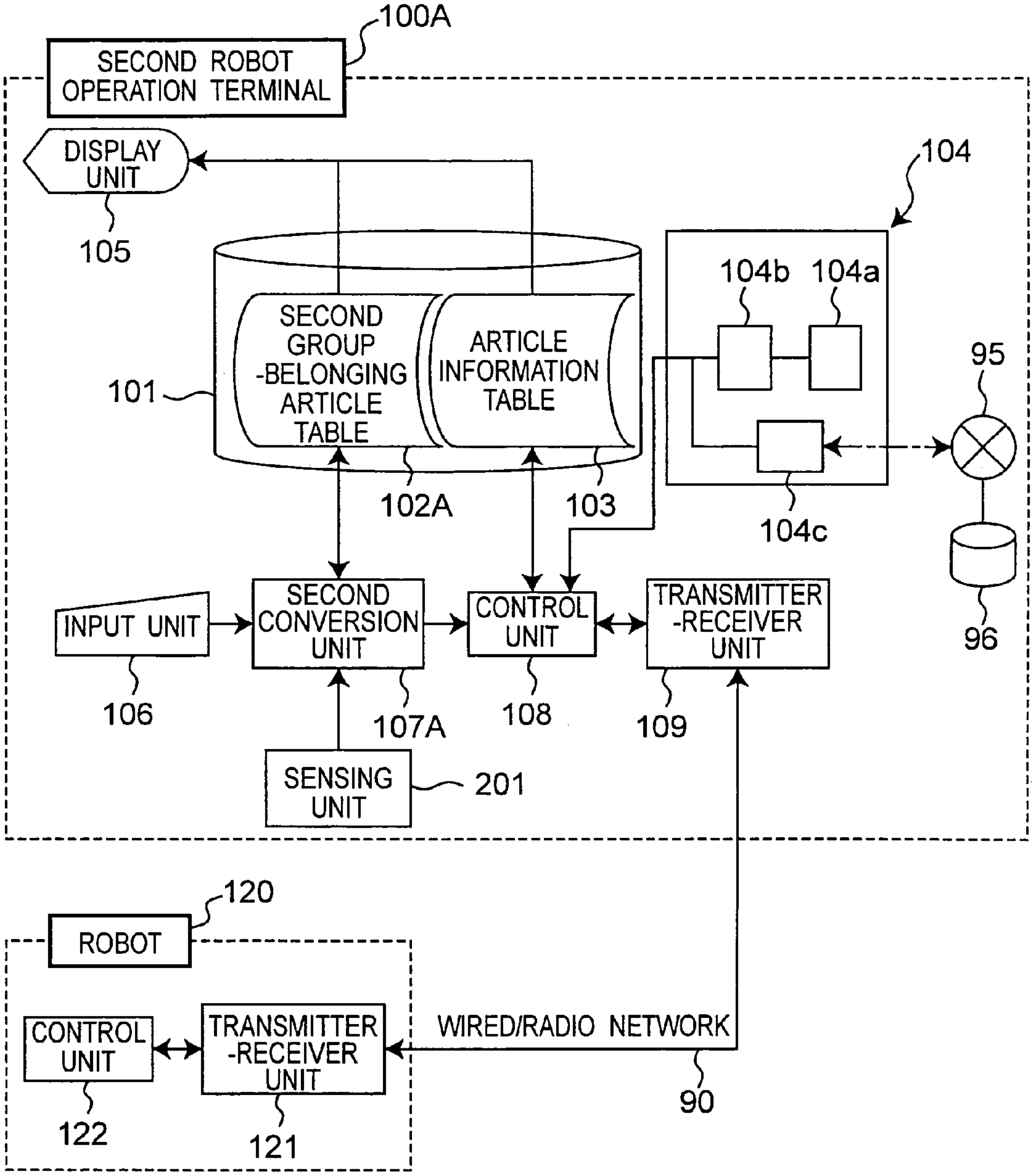
FIG. 7 is a block diagram that shows an article operation system in accordance with the second embodiment of the present invention.

FIG. 7 is a block diagram that shows an article operation system as one example of a living assistance system in accordance with a second embodiment of the present invention. In FIG. 7, the same constituent elements as those of FIG. 1 are indicated by the same reference numerals.

In comparison with the first robot operation terminal 100 of FIG. 1, the second robot operation terminal 100A is further provided with a sensing unit 201 which is connected to a second conversion unit 107A, for acquiring group-belonging condition information. Moreover, in place of the first group-belonging article table 102 and the first conversion unit 107 of the storage unit 101, the terminal unit is provided with and a second conversion unit 107A for converting the operation information, based upon the information of the second group-belonging article table 102A containing information in which, with respect to at least one group, a group-belonging condition is added to at least one article, and group-belonging condition information received from a sensing unit 201. The other structures are the same as those of FIG. 1.

FIG. 8 is a view that shows an example of information (group-belonging article information) stored in the second group-belonging article table 102A. In the same manner as FIG. 3, FIG. 8 shows ID information and a name of each of groups, and ID information relating to articles or groups that belong to the corresponding group. Moreover, with respect to a certain group, a condition required for an article(s) or a group(s) to belong to the certain group, that is, a group-belonging-condition (hereinafter, referred to simply as "belonging-condition"), is described in each of the article(s) or group(s) belonging to the corresponding group. For example, the group "G0004: company attendance" includes "0003: handkerchief", "G0001: valuables", "G0002: cold protection articles", and "G0003: rain gear" as the articles and groups belonging thereto, and with respect to belonging-conditions, the group "G0002: cold protection articles" includes "the air temperature is 10° C. or less", and the group "G0003: rain gear" includes "it is raining now, or it will be rainy in the near future". Here, each article or group, indicated by "-" in its belonging-condition, always belongs to the corresponding group.

The sensing unit 201 acquires condition information that is required for determining whether or not the belonging-conditions specified in the second group-belonging article table 102A are satisfied. Examples of the condition information include: the attribute information of the article (weight, volume, material, presence or absence of stain, the existing position thereof, etc.), time and date, meteorological conditions at presence or in the future (air temperature, humidity, weather, etc.) or traffic information, user's action schedule, type, number, total weight, or total volume of articles belonging to the group, or time elapsed after joining to the group, or information indicating the start or completion of a control system independent from the present article operation system, such as a refrigerator, a clothes washer, or the like.

The attribute information of the article can be detected in the same manner as the above-mentioned sensing unit 104. In this case, in the same manner as the sensing unit 104, the sensing unit 201 may be constituted by cameras or sensors, or may be constituted by a receiving unit for conducting a receiving process of information obtained by the cameras or sensors through a wired communication or a radio communication. Alternatively, this may be prepared as a function for receiving barcode information obtained by a sensor, and for accessing the Internet based upon the received information, or a function for receiving information obtained through a sensor from an identifying means or device attached to the article.

Moreover, the attribute information of the article may be read from an article information table 103 updated by the sensing unit 104 through the control unit 108. In this case, the sensing unit 201 only needs to have a function for accessing the article information table 103.

The time and date, air temperature, humidity, or weather can be detected by devices such as a timer, a temperature sensor, a humidity sensor, or a light quantity sensor, which are one example of the sensing unit 201. In this case, the sensing device 201 may be constituted by a timer and the above-mentioned various sensors. Moreover, at present, various information services and services that are managed and operated by individuals may be utilized through the Internet, and through these services, various pieces of information including time and date, air temperatures at present and in the future, the humidity or the weather as well as traffic information, or a person's action schedule can be obtained. In this case, the sensing unit 201 only needs to have a function for accessing the Internet.

Moreover, pieces of information, such as the type, number, total weight, or total volume of articles belonging to the group, or time elapsed after joining to the group, can be read from the second group-belonging article table 102A and the article information table 103. In this case, the sensing unit 201 only needs to have a function for accessing the second group-belonging article table 102A and the article information table 103. Furthermore, information indicating the start or completion of a control system independent from the present article operation system, such as a refrigerator, a clothes washer, or the like, can be detected by installing a sensor in each of the control systems. In this case, the sensing unit 201 only needs to have a function for receiving information from the sensor.

Figure 9A:
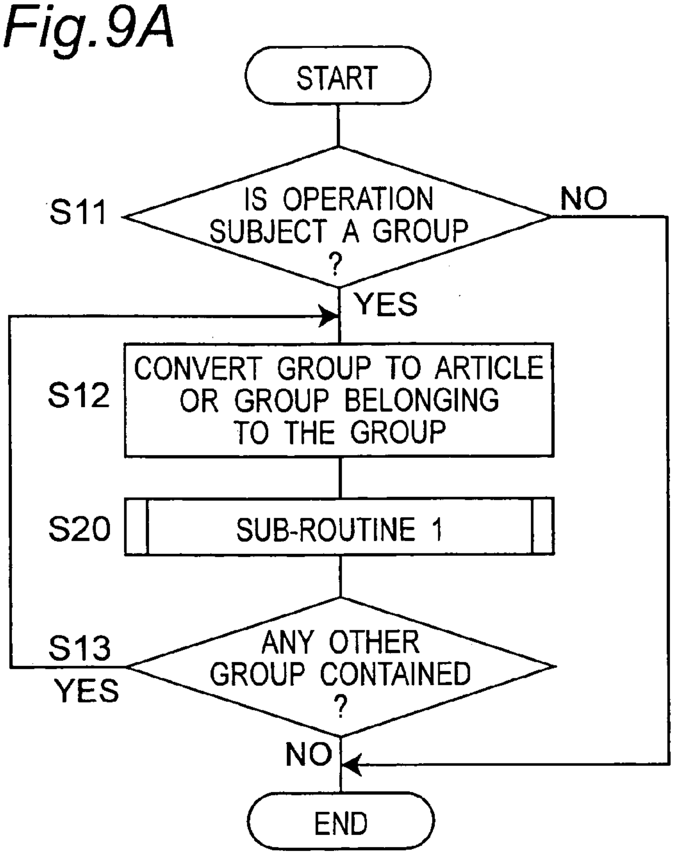
FIG. 9A is a flow chart that shows conversion processes in accordance with the second embodiment of the present invention.

The operations of the article operation system relating to the second embodiment are basically the same as those of the first embodiment except for the operation of the second conversion unit 107A. Referring to flow charts of FIGS. 9A and 9B, the following description will discuss operations in the second conversion unit 107A. In FIG. 9A, the same steps as those of FIG. 5 are indicated by the same symbols as those of FIG. 5. In the same manner as the first embodiment, operation information as shown in FIG. 4 is supposed to be given thereto through the input unit 106. Moreover, the items of pieces of condition information to be acquired by the sensing unit 201 are supposed to be air temperature, the weather at present and the weather in the near future, and the air temperature is supposed to be "8 degrees centigrade" and the weather at present and the weather in the future are respectively supposed to be "fine" and "cloudy".

First, at step S11, the second conversion unit 107A determines whether or not the operation subject indicated by the operation information is a group. In this case, since the ID information of the operation subject is "G0004" (Yes, at step S11), the sequence proceeds to step S12. When the operation subject is not a group, but an article (No, at step S11), the second conversion unit 107A does not convert the operation information, and completes the process of the second conversion unit 107A.

Next, at step S12, referring to the second group-belonging article table 102A shown in FIG. 8, the second conversion unit 107A converts the group forming the operation subject to an article or a group belonging to the corresponding group. In the above-mentioned example, FIG. 8 shows that the articles or groups belonging to a group "G0004: company attendance" are an article "0003: handkerchief" and a group "G0001: valuables", a group "G0002: cold prevention articles" and a group "G0003: rain gear". Therefore, the second conversion unit 107A converts the group "G0004: company attendance" in the operation information to the article "0003: handkerchief", the group "G0001: valuables", the group "G0002: cold prevention articles", and the group "G0003: rain gear". Thereafter, the sequence proceeds to step S20.

Figure 9B:
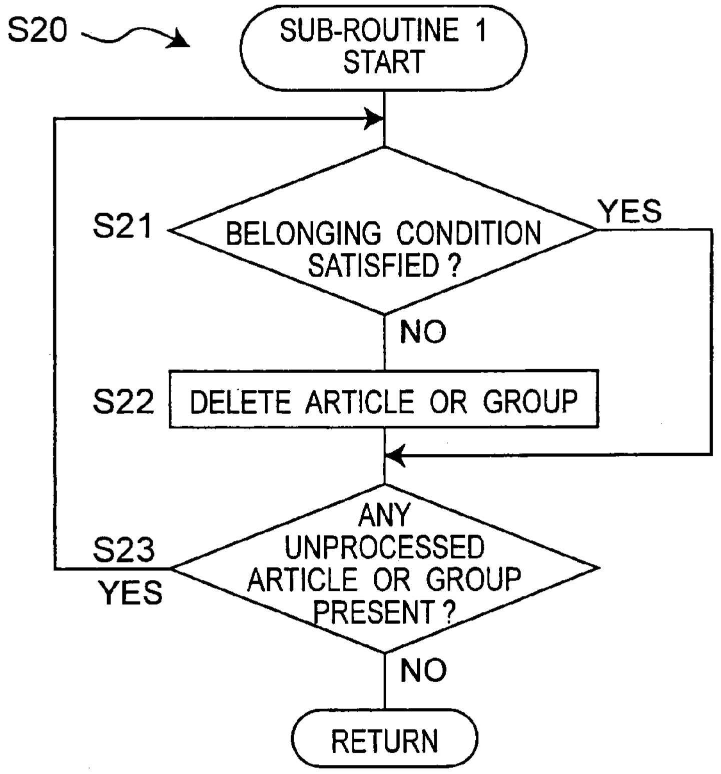
FIG. 9B is a flow chart that shows subroutine 1 in the conversion processes in accordance with the second embodiment of the present invention.

At step S20, a sub-routine 1 of FIG. 9B, stored in the second conversion unit 107A, is called for by the second conversion unit 107A so that with respect to the article or groups after conversion, the second conversion unit 107A carries out a determining process on each of the belonging-conditions. In this case, the second conversion unit 107A carries out determining processes on the article "0003: handkerchief", the group "G0001: valuables", the group "G0002: cold prevention articles", and the group "G0003: rain gear", respectively.

At the sub-routine 1, first, since the article "0003: handkerchief" always satisfies the conditions (Yes, at step S21), this is not deleted by the second conversion unit 107A, and the sequence proceeds the next step S23 where the second conversion unit 107A determines whether all the processes have finished on the article or groups after conversion, in other words, whether or not any unprocessed article or group still exists.

In this case, since the group "G0001: valuables", the group "G0002: cold prevention articles", and the group "G0003: rain gear" remain, the sequence returns to step S21, and among the group "G0001: valuables", the group "G0002: cold prevention articles", and the group "G0003: rain gear", first, the second conversion unit 107A carries out the determination on the group "G0001: valuables". In this case, since the group "G001: valuables" also always satisfies the conditions (Yes, at step S21), this is not deleted by the second conversion unit 107A, and the sequence proceeds the next step S23 where the second conversion unit 107A determines whether or not any unprocessed article or group still remains.

In this case, since the group "G0002: cold prevention articles" and the group "G0003: rain gear" still remain, the sequence returns to step S21 where the second conversion unit 107A carries out the determination on the group "G0002: cold prevention articles" (step S21). Since the second conversion unit 107A referred to the second group-belonging article table 102A shown in FIG. 8 last time, it has already been found from the second group-belonging article table 102A shown in FIG. 8 that the belonging-condition of the group "G0002: cold prevention articles" is "the air temperature is 10° C. or less". Upon receipt of the air temperature "8° C." from the sensing unit 201 as condition information, the second conversion unit 107A determines that the group "G0002: cold prevention articles" satisfies the belonging-condition (Yes, at step S21). For this reason, the group "G0002: cold prevention articles" is not deleted. Then, the sequence proceeds to the next step S23 where the second conversion unit 107A determines whether or not any unprocessed article or group still exists.

Moreover, since the group "G0003: rain gear" remains, the sequence returns to step S21 where the second conversion unit 107A carries out the determination on the group "G0003: rain gear" (step S21). Since the second conversion unit 107A referred to the second group-belonging article table 102A shown in FIG. 8 last time, it has already been found from the second group-belonging article table 102A shown in FIG. 8 that the belonging-condition of the group "G0003: rain gear" is ""it is raining now, or it will be rainy in the future". Upon receiving that the current weather is "fine" and the weather in the future is "cloudy" from the sensing unit 201 as the condition information, the second conversion unit 107A determines that the group "G0003: rain gear" does not satisfy the belonging-condition (No, at step S21). For this reason, the group "G0003: rain gear" is deleted by the second conversion unit 107A (step S22). With respect to the articles and groups after conversion, the second conversion unit 107A further determines whether or not all the processes have been finished, and since all the processes have been finished (No, at step S23), the sequence is returned from the sub-routine 1.

Next, at step S13, the second conversion unit 107A determines whether or not the operation information still includes any other groups as the operation subject. In this case, since the group "G0001: valuables" and the group "G0002: cold prevention articles" are still included (Yes, at step S13), the sequence returns to step S12. When no other groups are included (No, at step S13), the second conversion unit 107A completes the processes of the second conversion unit 107A.

At step S12, again, referring to the second group-belonging article table 102A shown in FIG. 8, the second conversion unit 107A converts the group "G0001: valuables" to the article "0001: watch" and the article "0002: wallet", and also converts the group "G0002: cold prevention articles" to the article "0004: muffler" and the article "0005: coat".

At step S20, the sub-routine 1 is called for so that the second conversion unit 107A carries out a determining process on each of the belonging-conditions for each article. For example, with respect to the article "0001: watch", since the conditions are always satisfied (Yes, step S21), this is not deleted by the second conversion unit 107A, and the sequence proceeds to the next step S23 where the second conversion unit 107A determines whether or not all the processes have been completed on the articles or groups after conversion, in other words, whether or not any unprocessed articles or groups still remain. Here, the article "0002: wallet", the article "0004: muffler", and the article "0005: coat" still remain, and among these, with respect to the article "0002: wallet", since this always satisfies the conditions (Yes, at step S21), this is not deleted by the second conversion unit 107A, and the sequence proceeds to the next step S23 where the second conversion unit 107A determines whether or not any unprocessed articles or groups still remain. Thereafter, in the same manner, the article "0004: muffler" and the article "0005: coat" are not deleted by the second conversion unit 107A respectively, and the sequence proceeds to the next step S23 where the second conversion unit 107A determines whether or not any unprocessed articles or groups still remain, and since no other unprocessed articles or groups remain (No, at step S23), the sequence is returned from the sub-routine 1. Here, since all the article "0001: watch", the article "0002: wallet", the article "0004: muffler", and the article "0005: coat" are supposed to always satisfy the conditions, these are not deleted.

At step S13, the second conversion unit 107A again determines whether or not the operation information contains any other groups as the operation subjects, and since no other groups are contained (No, at S13), the second conversion unit 107A completes the process of the second conversion unit 107A.

Figures 10, 11:
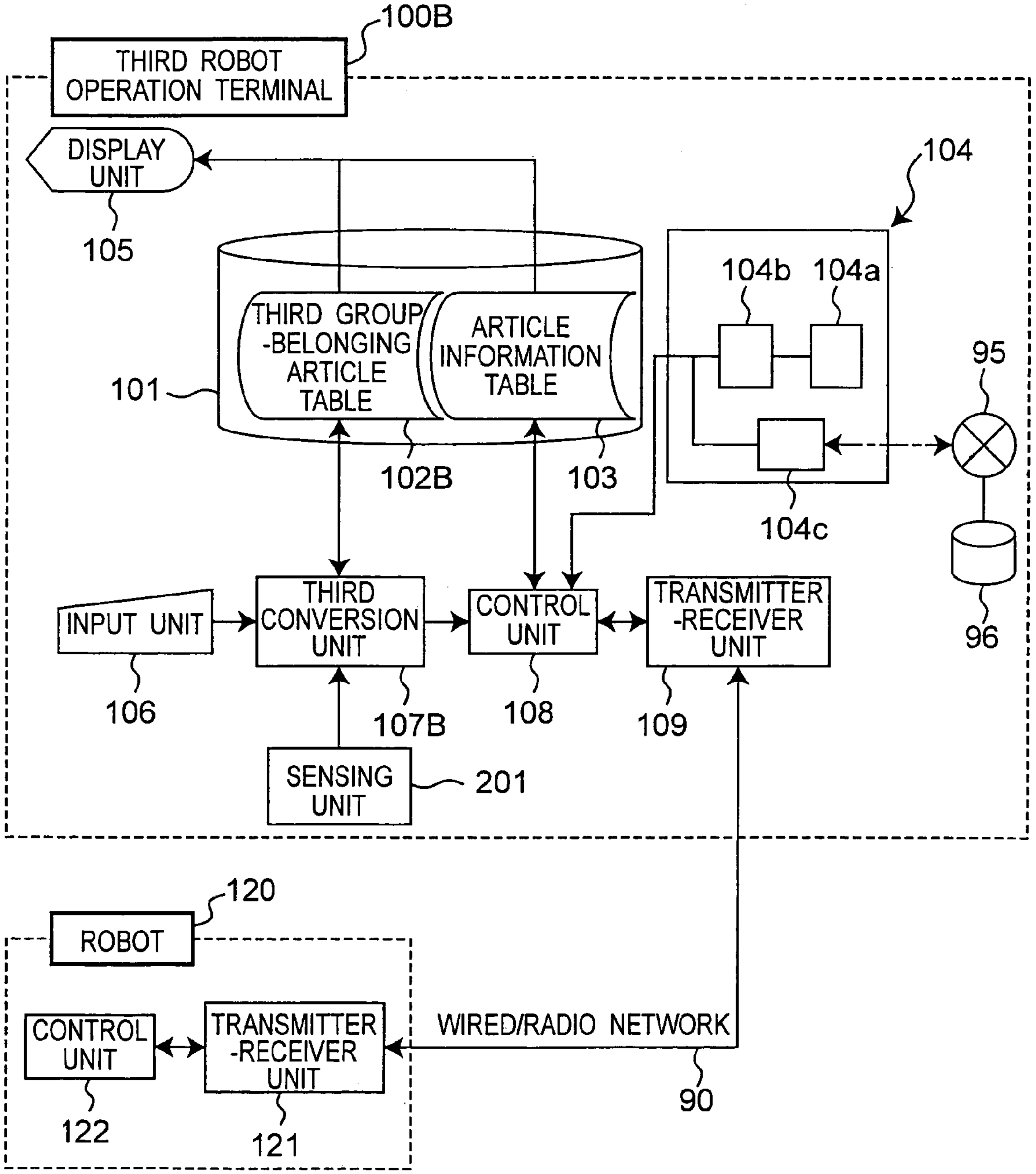
FIG. 10 is a view that shows operation information after conversion in accordance with the second embodiment of the present invention.
FIG. 11 is a block diagram that shows an article operation system that is one example of a living assistance system in accordance with a third embodiment of the present invention.

As a result of the above-mentioned operation, the operation information of FIG. 4 is converted as shown in FIG. 10. In FIG. 10, the article "0003: handkerchief", the article "0001: watch", the article "0002: wallet", and the article "0005: coat" are specified as operation subjects.

Here, since the air temperature is 8° C. that satisfies the belonging-condition of "10° C. or less", the article "0004: muffler" and the article "0005: coat" belonging to the group "G0002: cold prevention articles" are not deleted from the operation subjects; however, when the air temperature exceeds 10° C., the article "0004: muffler" and the article "0005: coat" are deleted from the operation subjects. Moreover, since the current weather is fine and the weather in the near future is rainy so that the belonging-condition, "it is raining now, or it will be rainy in the future", is not satisfied, the article "0006: umbrella" belonging to the group "G0003: rain gear" is deleted from the operation subjects; however, for example, when the weather in the future is rainy, the article "0006: umbrella" is left as the operation subjects.

In the same manner as the first embodiment, the operation information as shown in FIG. 10, which has been converted and outputted by the second conversion unit 107A, is given to the control unit 108. Based upon the operation information thus given, the control unit 108 generates operation commands for the robot 120 by reference to the article information table 103. These commands, generated by the control unit 108, are inputted to the control unit 122 of the robot 120 through the transmitter-receiver unit 109, the radio or wired network 90, and the transmitter-receiver unit 121. Based upon the inputted commands, the control unit 122 operates the robot 120. Thus, the article "0003: handkerchief", the article "0001: watch", the article "0002: wallet", the article "0004: muffler", and the article "0005: coat" are held by the robot 120, and transported to the position (500, 500).

As described above, in accordance with the second embodiment, based upon condition information obtained from the sensing unit 201, the second conversion unit 107A automatically converts the group indicated as the operation subjects to only the articles that satisfy the belonging-conditions by reference to the second group-belonging article table 102A. In general, there are many articles whose necessity is altered depending on changes in conditions, such as "cold prevention articles" being required when the air temperature is low and "rain gear" being required when it is rainy. Therefore, with respect to such articles, the user does not have to determine the necessity of each of these articles by taking the respective conditions into consideration through time consuming tasks, and it is only necessary for the user to input common operation information.

Moreover, in accordance with the second embodiment, operations, such as, for example, an operation in which, if the laundry basket is filled with articles to be washed, a washing process is started, can be specified. In this case, with respect to the article "laundry basket" belonging to the group "washing", the upper limit value of the number, the total weight, or the total volume of articles (soiled clothes) put in it is specified as its belonging-condition. Here, a weight sensor and a photo-sensor that can count the number of articles (soiled clothes) are installed at the opening portion of the laundry basket as a sensing unit 201. Then, operation information that specifies the operation subject as a group "washing" and the operation content as "transfer to the clothes washer" is inputted to the above system. Thus, the number of the articled to be washed in the article "laundry basket" and the total weight thereof are obtained from the sensing unit 201 as the condition information, and only when these exceed the upper limit values, that is, only when the belonging-conditions are satisfied, "the laundry basket" is carried to the clothes washer. Here, since devices, such as clothes washers, laundry baskets, or trash boxes, which use a volume as its control index, are present, the total volume can be dealt as condition information from the sensing unit 201. With respect to the detection method for the total volume, for example, the weight of an article is detected by a weight sensor and the value is multiplied by the density of the article to find the total volume. With respect to the devices to be used on the assumption that clothes are put therein, such as a clothes washer or a laundry basket, the above-mentioned method allows to detect a total volume with sufficient precision. In addition to this method, an infrared sensor switch is attached to the corresponding device in the height direction so that it becomes possible to detect that trashes or the like have been put into a trash box up to a predetermined height (bulk).

Moreover, for example, with respect to clothes, the upper limit value of the degree of soils may be specified as a belonging-condition; thus, such an operation in which, after soils occurring in clothes have become worse exceeding a certain degree, the clothes are washed can be carried out.

Furthermore, for example, with respect to the group "refrigerator", the upper limit value of elapsed time or elapsed days since the joining to the group may be specified as a belonging-condition, an operation in which among items stored in a refrigerator, only old articles (that is, articles exceeding the upper limit value of the elapsed time or elapsed days) are discarded can be carried out.

Third Embodiment

FIG. 11 is a block diagram that shows an article operation system as one example of a living assistance system in accordance with a third embodiment of the present invention. In FIG. 11, the same constituent elements as those of FIG. 1 and FIG. 7 are indicated by the same reference numerals.

In comparison with the second robot operation terminal 100A of FIG. 7, in place of the second group-belonging article table 102A and the second conversion unit 107A, the third robot operation terminal 100B is further provided with a third group-belonging article table 102B containing information in which, with respect to at least one group, selection condition information for an article is added, and a third conversion unit 107B for converting the operation information based upon selection condition information received from a sensing unit 201 and the information of the third group-belonging article table 102B. The selection condition information acquired from the sensing unit 201 is used for a selection process for an article based upon the selection condition information. The other structures are the same as those shown in FIG. 7.

FIG. 12 is a view that shows an example of information (group-belonging article information) stored in the third group-belonging article table 102B. In the same manner as FIG. 3, with respect to each of groups, FIG. 12 shows ID information and a name of each group, and ID information relating to articles or groups that belong to the corresponding group. Moreover, with respect to a certain group, a condition by which one article is selected from all the articles or one portion thereof belonging to the certain group, that is, a selection condition, is described therein. For example, with respect to a group “G0007: suits”, belonging-articles include an article “0010: gray suit”, an article “0011: dark blue suit”, and an article “0012: brown suit”, and with respect to selection conditions, the article “0010: gray suit” is selected on Monday and Thursday, the article “0011: dark blue suit” is selected on Tuesday and Friday, and the article “0012: brown suit” is selected on the other days. The selection condition is further determined so that, when an article “0016: dark blue necktie” is selected from the group “G0008: necktie”, the article “0011: dark blue suit” is not selected, but the article “0010: gray suit” or the article “0012: brown suit” is selected randomly.

Figure 13A:
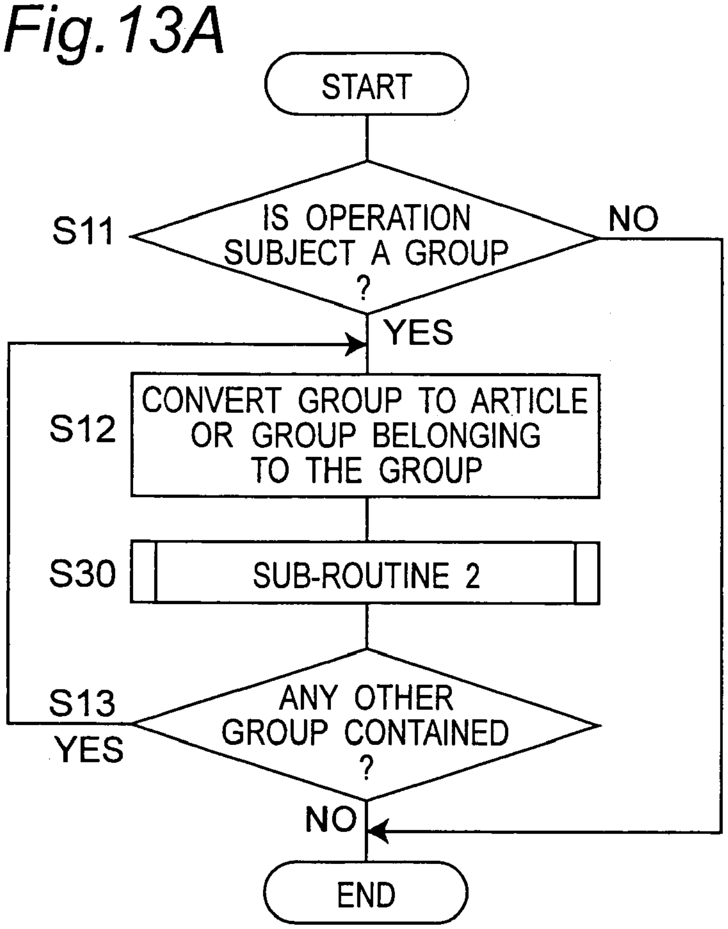
FIG. 13A is a flow chart that shows conversion processes in accordance with the third embodiment of the present invention.
Figure 13B:
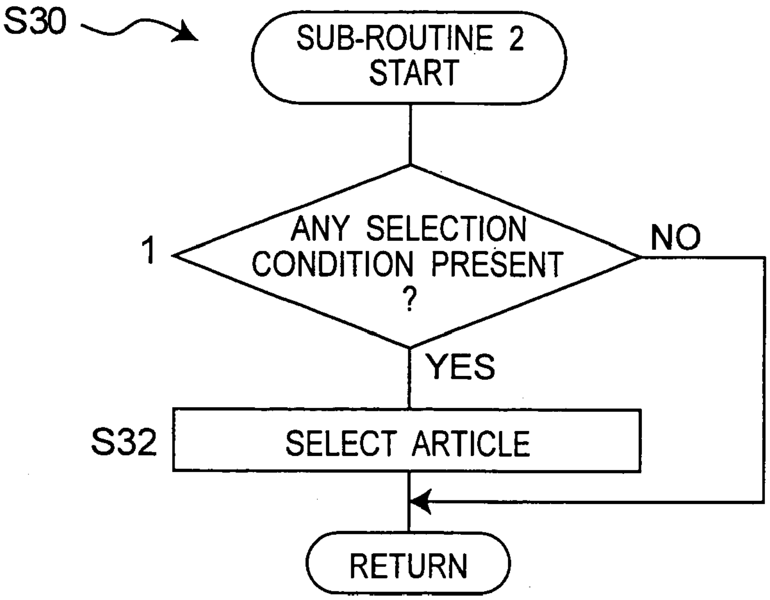
FIG. 13B is a flow chart that shows subroutine 2 in the conversion processes in accordance with the third embodiment of the present invention.

The operations of the article operation system relating to the third embodiment are basically the same as those of the first embodiment except for the operation of the third conversion unit 107B. Referring to flow charts of FIGS. 13A and 13B, the following description will discuss operations in the third conversion unit 107B. Here, the operation information as shown in FIG. 14 is supposed to be given to the third conversion unit 107B through the input unit 106. In FIG. 14, a group “G0009: company attendance clothes” is specified as a subject to be operated, and “transfer to position (2000, 2000)” is specified as the contents of operation. Moreover, items of condition information to be acquired by the sensing unit 201 are time and date and, in particular, day of the week, and in this case, the day of the week is supposed to be “Tuesday”. For this reason, a timer capable of detecting the day of the week is used or a transmitter-receiver unit capable of acquiring the day of the week through the Internet may be used as one example of the sensing unit 201.

First, at step S11, the third conversion unit 107B determines whether or not the operation subject indicated by the operation information is a group. In this case, since the ID information of the operation subject is “G0009” (Yes, at step S11), the sequence proceeds to step S12. When the operation subject is not a group, but an article (No, at step S11), the third conversion unit 107B does not convert the operation information, and completes the process of the third conversion unit 107B.

Next, at step S12, referring to the third group-belonging article table 102B shown in FIG. 12, the third conversion unit 107B converts the group forming the operation subject to an article or a group belonging to the corresponding group. In the above-mentioned example, FIG. 12 shows that a group “G0007: suits” and a group “G0008: neckties” belong to the group “G0009: company attendance clothes”. Therefore, the third conversion unit 107B converts the group “G0009: company attendance clothes” to the group “G0007: suits” and the group “G0008: neckties” in the operation information. Thereafter, the sequence proceeds to step S30.

At step S30, a sub-routine 2, stored in the third conversion unit 107B, is called for by the third conversion unit 107B so that selection processes are carried out based upon selection conditions by the third conversion unit 107B.

At the sub-routine 2, since the group “G0007: suits” and the group “G0008: neckties” respectively have no selection conditions (Yes, at step S31), no selection is made, with both of the groups being left as they are, and the sequence is returned from the sub-routine 2.

Next, at step S13, the third conversion unit 107B determines whether or not the operation information still includes any other groups as the operation subject. In this case, since the group “G0007: suits” and the group “G0008: neckties” are still included (Yes, at step S13), the sequence returns to step S12. When no other groups are included (No, at step S13), the third conversion unit 107B completes the processes of the third conversion unit 107B.

At step S12, again, referring to the third group-belonging article table 102B shown in FIG. 12, the third conversion unit 107B converts the group “G0007: suits” to the article “0010: gray suit”, the article “0011 dark blue suit”, and the article “0012: brown suit”, and also converts the group “G0008: neckties” to an article “0013: red necktie”, an article “0014: yellow necktie”, an article “0015: green necktie”, and an article “0016: dark blue necktie”.

At step S30, the sub-routine 2 stored in the third conversion unit 107B is called for by the third conversion unit 107B so that article selection processes are carried out based upon selection conditions by the third conversion unit 107B.

With respect to the article “0010: gray suit”, the article 0011: dark blue suit”, and the article 0012: brown suit”, since selection conditions are given (Yes, step S31), the selection of the article is carried out by the third conversion unit 107B at step S32. Here, the day of the week, “Tuesday”, is given as the condition information from the sensing unit 201, and the selection condition “Tuesday and Friday for 0011” is set as the selection condition as shown in FIG. 12. For this reason, the third conversion unit 107B selects the article “0011: dark blue suit”, and the article “0010: gray suit” and the article “0012: brown suit” other than this are deleted from the operation information by the third conversion unit 107B.

Next, with respect to the article “0013: red necktie”, the article “0014: yellow necktie”, the article “0015: green necktie”, and the article “0016: dark blue necktie”, the same selection process is carried out by the third conversion unit 107B. In other words, since selection conditions are also given to these articles (Yes, at step S31), the selection of the article is carried out by the third conversion unit 107B at step S32. In the above-mentioned example, since “random selection for 0013 to 0016” is set as the selection condition as shown in FIG. 12, basically, any one of the article “0013: red necktie”, the article “0014: yellow necktie”, the article “0015: green necktie”, and the article “0016: dark blue necktie” is randomly selected. However, since the article “0011: dark blue suit” has been preliminarily selected from the group “G0007: suits”, the article “0016: dark blue necktie” is excluded by the third conversion unit 107B under the selection condition “upon selection of 0011, 0016 should not be selected”, and any one of the article “0013: red necktie”, the article “0014: yellow necktie”, and the article “0015: green necktie” is randomly selected by the third conversion unit 107B. Here, supposing that the article “0013: red necktie” be selected, the article “0014: yellow necktie” and “0015: green necktie” other than this are excluded from the operation information by the third conversion unit 107B. Thereafter, the sequence is returned from the sub-routine 2.

At step S13, the third conversion unit 107B again determines whether or not the operation information contains any other groups as the operation subjects, and since no other groups are contained (No, at step S13), the third conversion unit 107B completes the process of the third conversion unit 107B.

As a result of the above-mentioned operation, the operation information of FIG. 14 is converted as shown in FIG.

15. In FIG. 15, the article "0011: dark blue suit" and the article "0013: red necktie" are specified as operation subjects.

Here, since the day of the week is "Tuesday", the article "0011: dark blue suit" is selected; however, when it is Monday or Thursday, "0010: gray suit" is selected, and when it is Wednesday, Saturday, or Sunday, the article "0012: brown suit" is selected. Here, when it is Friday, the article "0011: dark blue suit" is selected. Moreover, since the article "0011: dark blue suit" is selected, the article "0016: dark blue necktie" is excluded from the selection subjects; however, when the day of the week is neither Tuesday nor Friday, and when the article "0011: dark blue suit" is not selected, a random selection is made from the group including the article "0016: dark blue necktie".

In the same manner as the first embodiment, the operation information as shown in FIG. 15, which has been converted and outputted by the third conversion unit 107B, is given to the control unit 108. Based upon the operation information thus given, the control unit 108 generates operation commands for the robot 120 by reference to the article information table 103. These commands, generated by the control unit 108, are inputted to the control unit 122 of the robot 120 through the transmitter-receiver unit 109, the radio or wired network 90, and the transmitter-receiver unit 121. Based upon the inputted commands, the control unit 122 operates the robot 120. Thus, the article "0011: dark blue suit" and the article "0013: red necktie" are held by the robot 120, and transported to the position (2000, 2000).

As described above, in accordance with the third embodiment, referring to the third group-belonging article table 102B, based upon condition information obtained from the sensing unit 201, the third conversion unit 107B automatically converts the group indicated as the operation subjects to the articles that are selected based upon the selection conditions. With this arrangement, the operator of the robot 120 is allowed to finish, for example, coordinates of clothes, by only inputting common operation information.

In the case when only "random selection" and "relationship with other articles" are specified as the selection conditions, it is not necessarily required to acquire the condition information from the sensing unit 201.

Moreover, another arrangement may be used in which among articles belonging to a group, one article is selected from one portion thereof, with the rest of them being converted as they are. For example, in the case when the group "neckties" includes a necktie pin in addition to a plurality of neckties, an operation in which one necktie is selected from the neckties, with the necktie pin being converted as it is, may be carried out.

Here, the third embodiment may be executed in combination with the second embodiment. In this case, the selection conditions as explained in the third embodiment may be combined with belonging-conditions as explained in the second embodiment, and listed on the group-belonging article information. Then, step S20 in the second embodiment, that is, the sub-routine 1, may be executed before and after step S30, or in parallel with each other.

Fourth Embodiment

Figure 16:
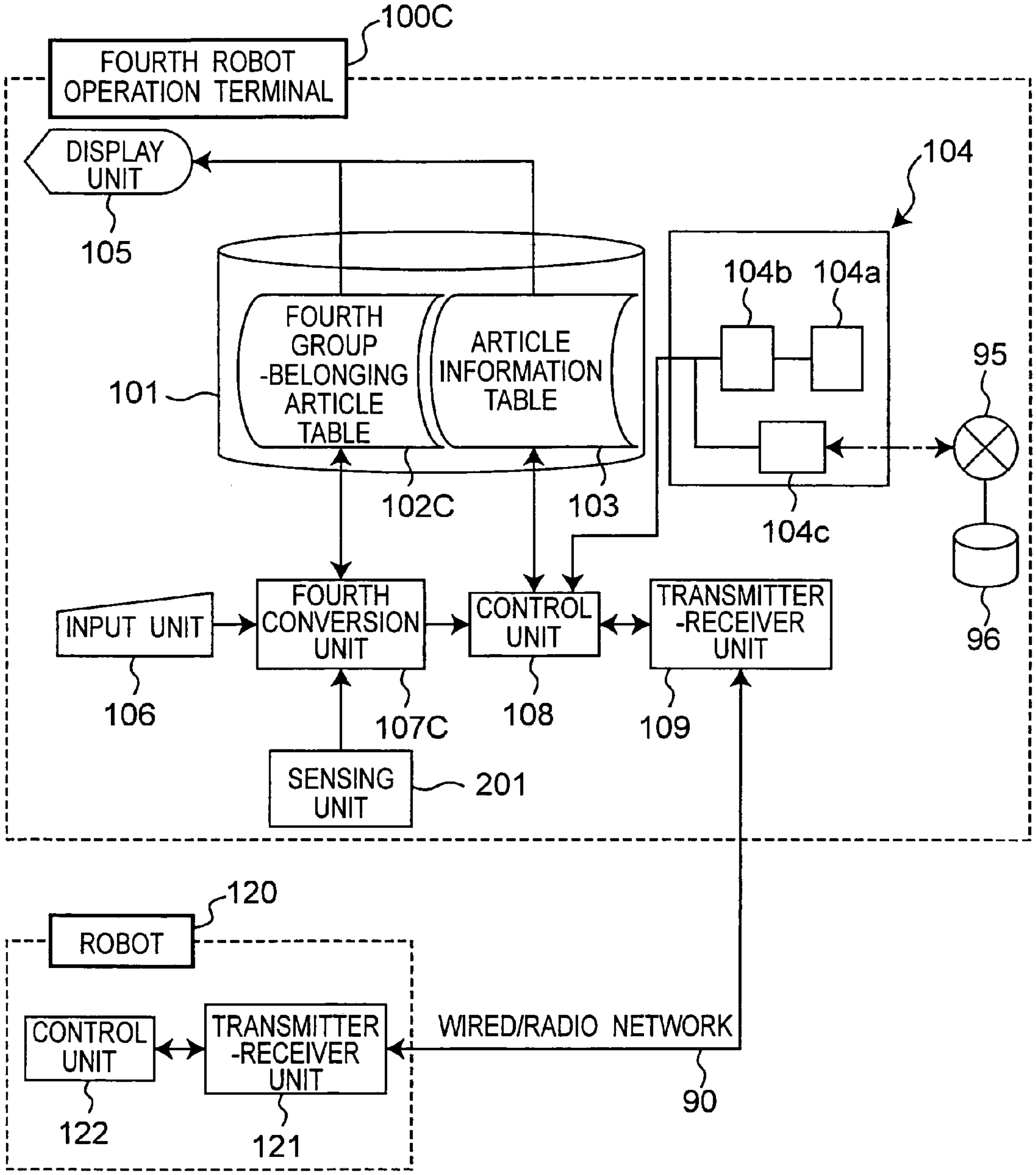
FIG. 16 is a block diagram that shows an article operation system that is one example of a living assistance system in accordance with a fourth embodiment of the present invention.

FIG. 16 is a block diagram that shows an article operation system as one example of a living assistance system in accordance with a fourth embodiment of the present invention. In FIG. 16, the same constituent elements as those of FIG. 1, FIG. 7, and FIG. 11 are indicated by the same reference numerals.

In comparison with the second robot operation terminal 100A of FIG. 7, in place of the second group-belonging article table 102A and the second conversion unit 107A, a fourth robot operation terminal 100C of FIG. 16 is further provided with a fourth group-belonging article table 102C in which with respect to at least one group, at least one article is added by its operation contents and execution conditions, and a fourth conversion unit 107C for converting the operation information based upon condition information received from a sensing unit 201 and the information of the fourth group-belonging article table 102C. The condition information acquired from the sensing unit 201 is used for determining whether or not the execution conditions are satisfied. The other structures are the same as those shown in FIG. 7.

FIG. 17 is a view that shows an example of information (group-belonging article information) stored in the fourth group-belonging article table 102C. In the same manner as FIG. 3, with respect to each of groups, FIG. 17 shows ID information and a name of each group, and ID information relating to articles or groups that belong to the corresponding group. Moreover, with respect to a certain group, the operation contents and conditions used for executing the operation contents, that is, execution conditions, relating to all or one portion of the articles belonging to the certain group, are listed. For example, a group "G0006: washed articles" includes a group "G0005: clothes" as the group that belong thereto, and two operation contents and execution conditions, that is, "transport to a drying place located at position (1000, 1000)" and "it is not raining now and it will not be rainy in the future" as well as "transport to a clothes dryer located at position (2000, 2000)" and "it is raining now and it will be rainy in the future", as the operation contents and execution conditions.

Figure 18A:
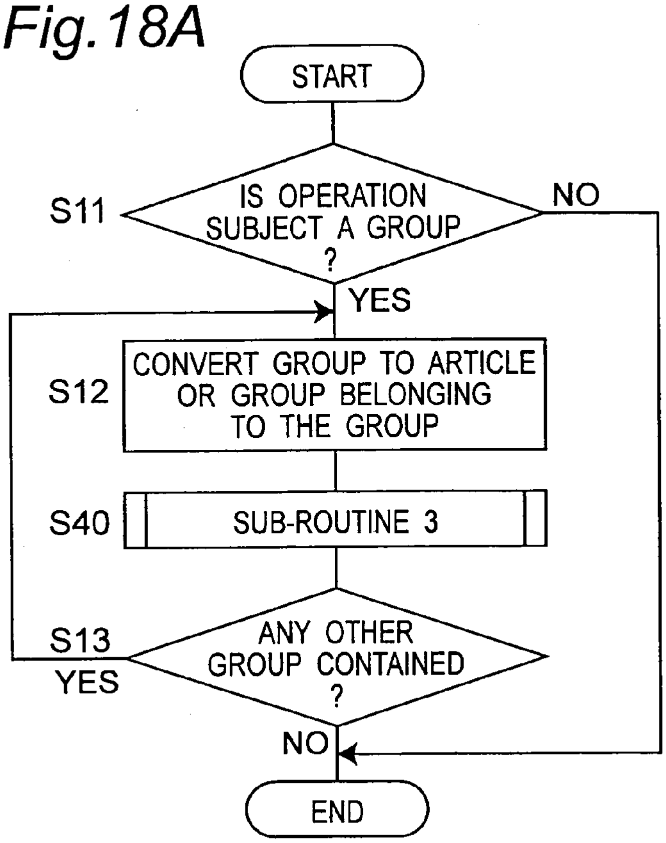
FIG. 18A is a flow chart that shows conversion processes in accordance with the fourth embodiment of the present invention.
Figure 18B:
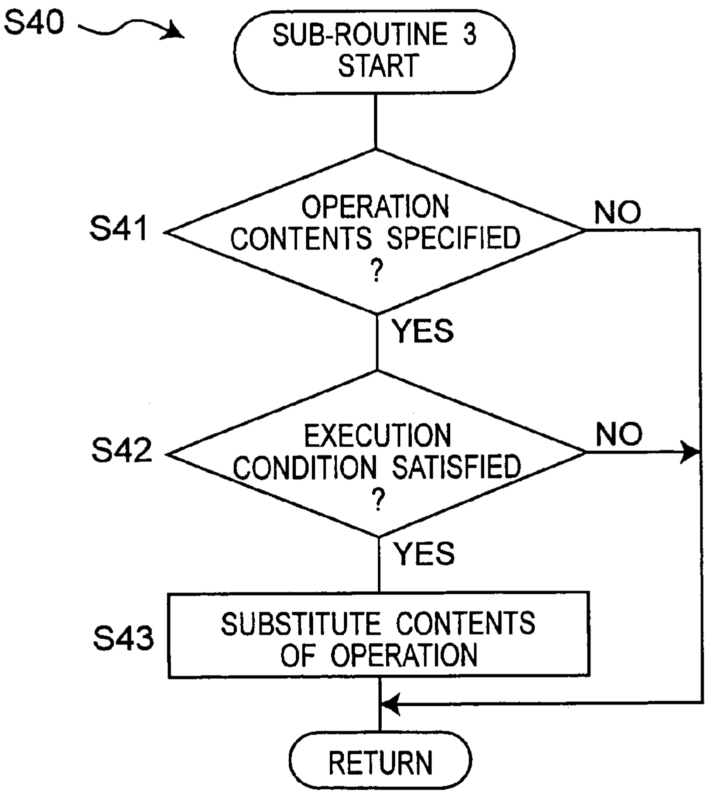
FIG. 18B is a flow chart that shows subroutine 3 in the conversion processes in accordance with the fourth embodiment of the present invention.

The operations of the article operation system relating to the fourth embodiment are basically the same as those of the first embodiment except for the operation of the fourth conversion unit 107C. Referring to flow charts of FIGS. 18A and 18B, the following description will discuss operations in the fourth conversion unit 107C. Here, the operation information as shown in FIG. 19 is supposed to be given to the fourth conversion unit 107C through the input unit 106. In FIG. 19, a group "G0006: washed articles" is specified as a subject to be operated, and "transfer to position (500, 500)" is specified as the contents of operation. Moreover, items of condition information to be acquired by the sensing unit 201 are the present and future weathers, and in this case, the present weather is supposed to be "cloudy" and the future weather is supposed to be "fine". For this reason, as one example of the sensing unit 201 may include a temperature sensor, a humidity sensor, or a light quantity sensor that can detect the weather, or a transmitter-receiver unit that acquires the present and future air temperature, humidity or weather through the Internet may be used.

First, at step S11, the third conversion unit 107B determines whether or not the operation subject indicated by the operation information is a group. In this case, since the ID information of the operation subject is "G0006" (Yes, at step S11), the sequence proceeds to step S12. When the operation subject is not a group, but an article (No, at step S11), the third conversion unit 107B does not convert the operation information, and completes the process of the third conversion unit 107B.

Next, at step S12, referring to the fourth group-belonging article table 102C shown in FIG. 17, the fourth conversion unit 107C converts the group forming the operation subject to an article or a group belonging to the corresponding group. FIG. 17 shows that a group "G0006: washed articles"

includes the group “G0005: clothes” and an article “0009: sneakers”. Therefore, the fourth conversion unit 107C converts the group “G0006: washed articles” to the group “G0005: clothes” and the group “0009: sneakers” in the operation information. Thereafter, the sequence proceeds to step S40.

At step S40, a sub-routine 3, stored in the fourth conversion unit 107C, is called for by the fourth conversion unit 107C so that substitution processes of the operation contents are carried out by the fourth conversion unit 107C.

First, with respect to the group “G0005: clothes”, the fourth conversion unit 107C carries out substitution processes of the operation contents. In FIG. 17, since two kinds of operation contents are specified with respect to the group “G005: clothes” (Yes, at step S41), the sequence proceeds to step S42 where the fourth conversion unit 107C determines whether or not the respective execution conditions are satisfied. Here, since the sensing unit 201 shows as condition information that the current weather is “cloudy” and the future weather will be “fine”, “the present and future weathers are not rainy” of the execution conditions of the two kinds of operation contents, is satisfied (Yes, at step S42). For this reason, the fourth conversion unit 107C converts the operation contents of the group “G0005: clothes” to “transfer to a drying place located at position (1000, 1000)” (step S43).

Next, with respect to the article “0009: sneakers”, substitution processes of the operation contents are carried out. In FIG. 17, with respect to the article “0009: sneakers”, since operation contents are specified (Yes, at step S41), and since its execution condition is “unconditional” and always satisfied (Yes, at step S42), the fourth conversion unit 107C converts the operation contents of the article “0009: sneakers” to “transfer to a shade-drying place located at position (3000, 3000)” (step S43). Thereafter, the sequence is returned from the sub-routine 3.

Next, at step S13, the fourth conversion unit 107C determines whether or not the operation information still includes any other groups as the operation subject. In this case, since still another group “G0005: clothes” is included (Yes, at step S13), the sequence returns to step S12. When no other groups are included (No, at step S13), the fourth conversion unit 107C completes the processes of the fourth conversion unit 107C.

At step S12, again, referring to the fourth group-belonging article table 102C shown in FIG. 17, the fourth conversion unit 107C converts the group “G0005: clothes” to the article “0007: T-shirts” and the article “008: Shirts”.

At step S40, the sub-routine 3 stored in the fourth conversion unit 107C is called for by the fourth conversion unit 107C so that substitution processes of the operation contents are carried out by the fourth conversion unit 107C, and as shown in FIG. 17, since no operation contents are specified on the article “0007: T-shirts” and the article “008: Shirts” (No, at step S41), the sequence is returned from the sub-routine 3, without carrying out the substitution process of the operation contents.

At step S13, the fourth conversion unit 107C again determines whether or not the operation information contains any other groups as the operation subjects, and since no other groups are contained (No, at step S13), the fourth conversion unit 107C completes the process of the fourth conversion unit 107C.

As a result of the above-mentioned operation, the operation information of FIG. 19 is converted as shown in FIG. 20. In FIG. 20, the article “0007: T-shirts”, the article “0008: Shirts”, and the article “0009: sneakers” are specified as operation subjects, and with respect to the contents of operations, “transfer to a drying place located at position (1000, 1000)” is specified with respect to the article “0007: T-shirts” and the article “0008: Shirts”, and “transfer to a shade-drying place located at position (3000, 3000)” is specified with respect to the article “0009: sneakers”, respectively.

Here, since the present weather is “cloudy”, and since the future weather is “fine”, the operation contents are substituted by the content “transfer to a drying place” with respect to the article “0007: T-shirts” and the article “0008: Shirts”; however, for example, when the future weather is “rainy”, the operation contents are substituted by “transfer to a clothes dryer located at position (2000, 2000) in the execution conditions.

In the same manner as the first embodiment, the operation information as shown in FIG. 20, which has been converted and outputted by the fourth conversion unit 107C, is given to the control unit 108. Based upon the operation information thus given, the control unit 108 generates operation commands for the robot 120 by reference to the article information table 103. These commands, generated by the control unit 108, are inputted to the control unit 122 of the robot 120 through the transmitter-receiver unit 109, the radio or wired network 90, and the transmitter-receiver unit 121. Based upon the inputted commands, the control unit 122 operates the robot 120. Thus, the article “0007: T-shirts” and the article “0008: Shirts” are held by the robot 120 so that the operation “transfer to a drying place” is carried out.

As described above, in accordance with the fourth embodiment, referring to the fourth group-belonging article table 102*c*, the fourth conversion unit 107C automatically substitutes the operation contents when the condition information obtained from the sensing unit 201 satisfies the execution conditions. With this arrangement, the operator of the robot 120 is allowed to finish an operation, such as a washed article-drying operation, in which the operation contents (drying places) are changed depending on conditions (present or future weather), by only inputting common operation information.

Here, the fourth embodiment may be executed in combination with the second embodiment or the third embodiment. In this case, the operation contents with execution conditions as explained in the fourth embodiment may be combined with belonging-conditions and selection conditions as explained in the second and third embodiments, and listed on the group-belonging article information. Then, step S20 in the second embodiment, that is, the sub-routine 1, or step S30 in the third embodiment, that is, the sub-routine 2, may be executed before and after step S40, or in parallel with each other.

Fifth Embodiment

Figure 21:
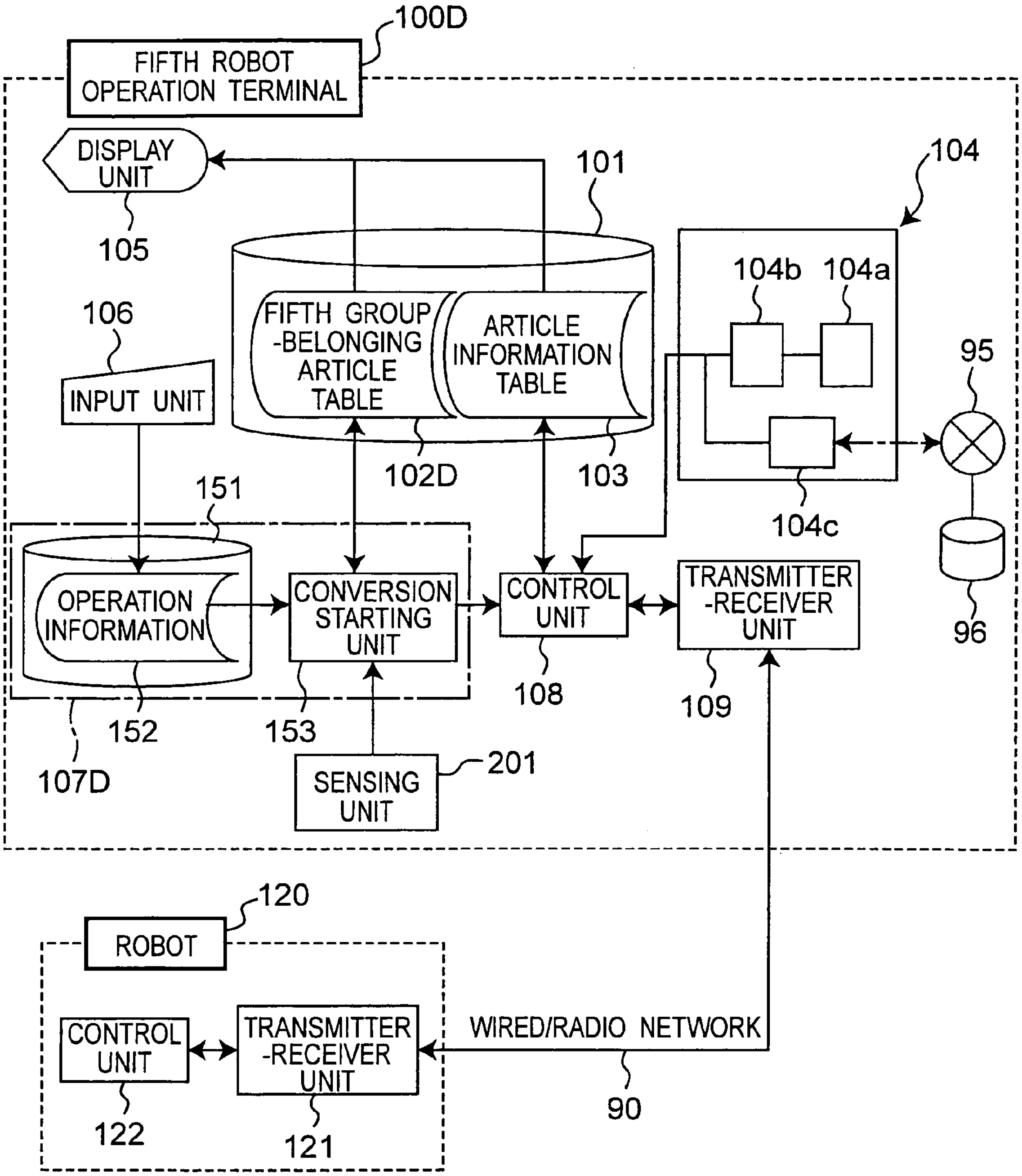
FIG. 21 is a block diagram that shows an article operation system that is one example of a living assistance system in accordance with a fifth embodiment of the present invention.

FIG. 21 is a block diagram that shows an article operation system as one example of a living assistance system in accordance with a fifth embodiment of the present invention. In FIG. 21, the same constituent elements as those of FIG. 1, FIG. 7, FIG. 11, and FIG. 16 are indicated by the same reference numerals.

In comparison with the second robot operation terminal 100A of FIG. 7, in place of the second group-belonging article table 102A and the second conversion unit 107A, a fifth robot operation terminal 100D of FIG. 21 is further provided with a fifth group-belonging article table 102D in which with respect to at least one group, operation starting conditions are added, and a fifth conversion unit 107D for converting the operation information referring to condition information received from a sensing unit 201 and the fifth group-belonging article table 102D. The condition information acquired from the sensing unit 201 is used for determining whether or not the operation starting conditions are satisfied. The fifth conversion unit 107D is provided with a storage unit 151 which is connected to the input unit 106, for temporarily storing operation information 152 obtained from the input unit 106, and a conversion starting unit 153 which, is connected to the storage unit 151, the sensing unit 201, the fifth group-belonging article table 102D, and the control unit 108, and, upon determining that the operation starting conditions have been satisfied based upon the condition information acquired from the sensing unit 201, starts converting the operation information 152 stored in the storage unit 151. The other structures are the same as those shown in FIG. 7.

Figures 22, 23:
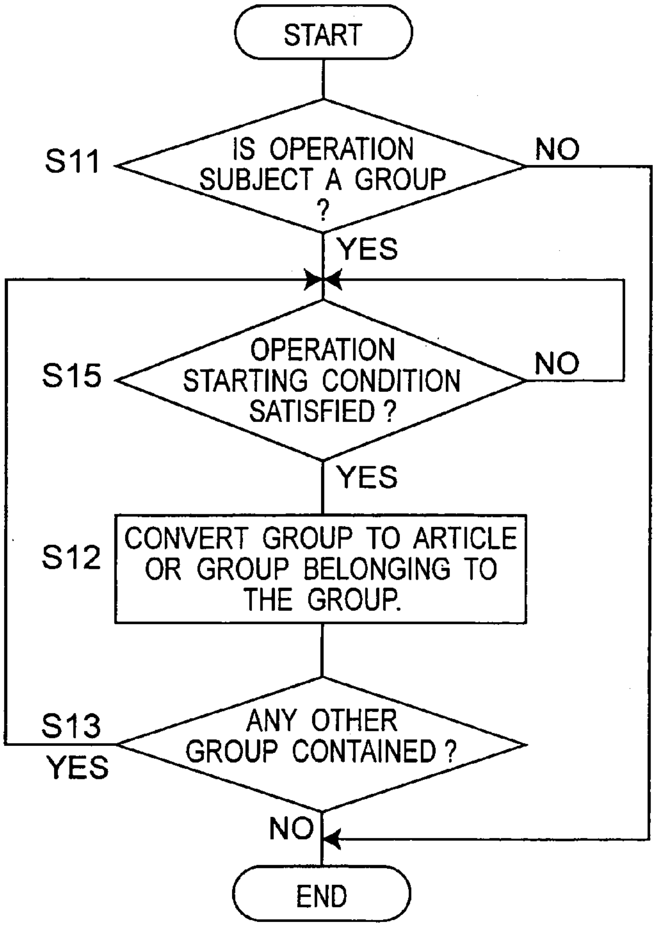
FIG. 22 is a view that shows one example of group-belonging article information in accordance with the fifth embodiment of the present invention.
FIG. 23 is a flow chart that shows conversion processes in accordance with the fifth embodiment of the present invention.

FIG. 22 is a view that shows one example of information (group-belonging article information) stored in the fifth group-belonging article table 102D. In the same manner as FIG. 3, with respect to each of groups, FIG. 22 shows ID information and a name of each group, and ID information relating to articles or groups that belong to the corresponding group. Moreover, with respect to a certain group, the conditions used for starting the operation on the corresponding group, that is, operation starting conditions, are listed. For example, a group "G0007: articles to be washed" includes a group "G0005: clothes" and an article "0009: sneakers" as the article or the group that belong thereto, and "time 18:00" is given as its operation start condition.

The operations of the article operation system relating to the fifth embodiment are basically the same as those of the first embodiment except for the fifth conversion unit 107D. Referring to flow charts of FIG. 23, the following description will discuss operations of the conversion starting unit 153 in the fifth conversion unit 107D. Here, operation information as shown in FIG. 24 is supposed to be stored in the storage unit 151 inside the fifth conversion unit 107D. In FIG. 24, a group "G0007: articles to be washed" is specified as a subject to be operated, and "transfer to a clothes washer located at position (4000, 4000)" is specified as the contents of the operation. Moreover, an item of condition information to be acquired by the sensing unit 201 is supposed to be time. For this reason, a timer capable of detecting time is used, or a transmitter-receiver unit capable of acquiring time though the Internet may be used, as one example of the sensing unit 201.

First, at step S11, the fifth conversion unit 107D determines whether or not the operation subject indicated by the operation information is a group. In this case, since the ID information of the operation subject is the group "G0007" (Yes, at step S11), the sequence proceeds to step S15. When the operation subject is not a group, but an article (No, at step S11), the fifth conversion unit 107D does not convert the operation information, and completes the process of the fifth conversion unit 107D.

Next, at step S15, referring to the fifth group-belonging article table 102D shown in FIG. 22, the fifth conversion unit 107D determines whether or not the operation starting condition of the group forming the operation subject is satisfied. Since FIG. 22 shows that the operation starting condition of the group "G0007: articles to be washed" is "time 18:00", the sequence proceeds to step S12 when the time acquired from the sensing unit 201 is "18:00" (Yes, at step S15). In the other cases, the sequence again returns to step S15. Therefore, the processes are not carried out thereafter, until it has become time "18:00".

Next, at step S12, referring to the group-belonging article table 102D shown in FIG. 22, the fifth conversion unit 107D converts the group forming the operation subject to articles or respective groups that belong to the corresponding group. FIG. 22 shows that the group "G0005: clothes" and the article "0009: sneakers" belong to the group "G0007: articles to be washed". Therefore, the fifth conversion unit 107D converts the group "G0007: articles to be washed" to the group "G0005: clothes" and the article "0009: sneakers" in the operation information. Thereafter, the sequence proceeds to step S13.

Next, at step S13, the fifth conversion unit 107D determines whether or not the operation information still includes any other groups as the operation subject. In this case, since the group "G0005: clothes" is still included (Yes, at step S13), the sequence returns to step S15. When no other groups are included (No, at step S13), the fifth conversion unit 107D completes the processes of the fifth conversion unit 107D.

At step S15, again, with respect to the group "G0005: clothes", it is determined whether or not the operation starting condition is satisfied, and since the operation starting condition is "unconditional" (Yes, at step S15), the sequence proceeds to step S12, and referring to the group-belonging article table 102D shown in FIG. 22, the fifth conversion unit 107D converts the group "G0005: clothes" to the article "0007: T-shirts" and the article "0008: Shirts".

Next, at step S13, the fifth conversion unit 107D again determines whether or not the operation information still includes any other groups as the operation subject, and since no other group is contained therein (No, at step S13), the fifth conversion unit 107D completes the processes of the fifth conversion unit 107D.

As a result of the above-mentioned operation, the operation information of FIG. 24 is converted as shown in FIG. 25. In FIG. 25, the article "0007: T-shirts", the article "0008: Shirts", and the article "0009: sneakers" are specified as the operation subjects, and "transfer to a clothes washer located at position (4000, 4000)" as the contents of the operations. This conversion starts executing at time 18:00, as specified by the operation starting time.

In the same manner as the first embodiment, the operation information as shown in FIG. 25, which has been converted and outputted by the fifth conversion unit 107D, is given to the control unit 108. Based upon the operation information thus given, the control unit 108 generates operation commands for the robot 120 by reference to the article information table 103. These commands, generated by the control unit 108, are inputted to the control unit 122 of the robot 120 through the transmitter-receiver unit 109, the radio or wired network 90, and the transmitter-receiver unit 121. Based upon the inputted commands, the control unit 122 operates the robot 120. Thus, at the time of 18:00 that is the operation starting condition, the article "0007: T-shirts", the article "0008: Shirts", and the article "0009: sneakers" are held by the robot 120 so that the operation "transfer to a clothes washer located at position (4000, 4000)" is carried out.

As described above, in accordance with the fifth embodiment, referring to the fifth group-belonging article table 102D, the fifth conversion unit 107D starts converting the operation information when the condition information acquired from the sensing unit 201 has satisfied the operation starting condition. With this arrangement, for example, with respect to an operation the timing of execution of which has been determined, the user no longer needs to take the timing into consideration, and only needs to preliminarily input the operation information.

In accordance with the fifth embodiment, for example, upon instructing the "washing" operation, the starting time may be determined differently depending on the material, or color and pattern of the article, or the degree of soils thereon. Moreover, by setting the upper limit value of the weight or volume of the article as the operation starting condition, not limited to the washing, for example, such an operation in which, when trashes, which are articles deposited in "a trash box", have become a predetermined weight or volume, the trashes are transferred to an incinerator may be carried out. Alternatively, such an operation in which, soiled clothes, which are articles deposited in "a laundry box", has become a predetermined weight or volume, the articles are carried to a clothes washer may be carried out.

Moreover, by specifying the presence or absence of the operation starting or completion information of another control system as the operation starting condition, for example, such an operation in which, after completion of a washing operation in a clothes washer, the washed articles are transferred to a drying place, or such an operation in which after an incoming-call operation of a cellular phone has been started, the cellular phone is transported, may be carried out.

Here, the fifth embodiment may be executed in combination with the second to fourth embodiments. In this case, the operation starting conditions as explained in the fifth embodiment may be combined with belonging-conditions as explained in the second embodiment, selection conditions as explained in the third embodiment, or operation contents with execution conditions as explained in the fourth embodiment, and listed on the group-belonging article information. Then, step S20 in the second embodiment, that is, the sub-routine 1, or step S30 in the third embodiment, that is, the sub-routine 2, or step S40 in the fourth embodiment, that is, the sub-routine 3 may be executed after step S12.

Sixth Embodiment

Figure 26:
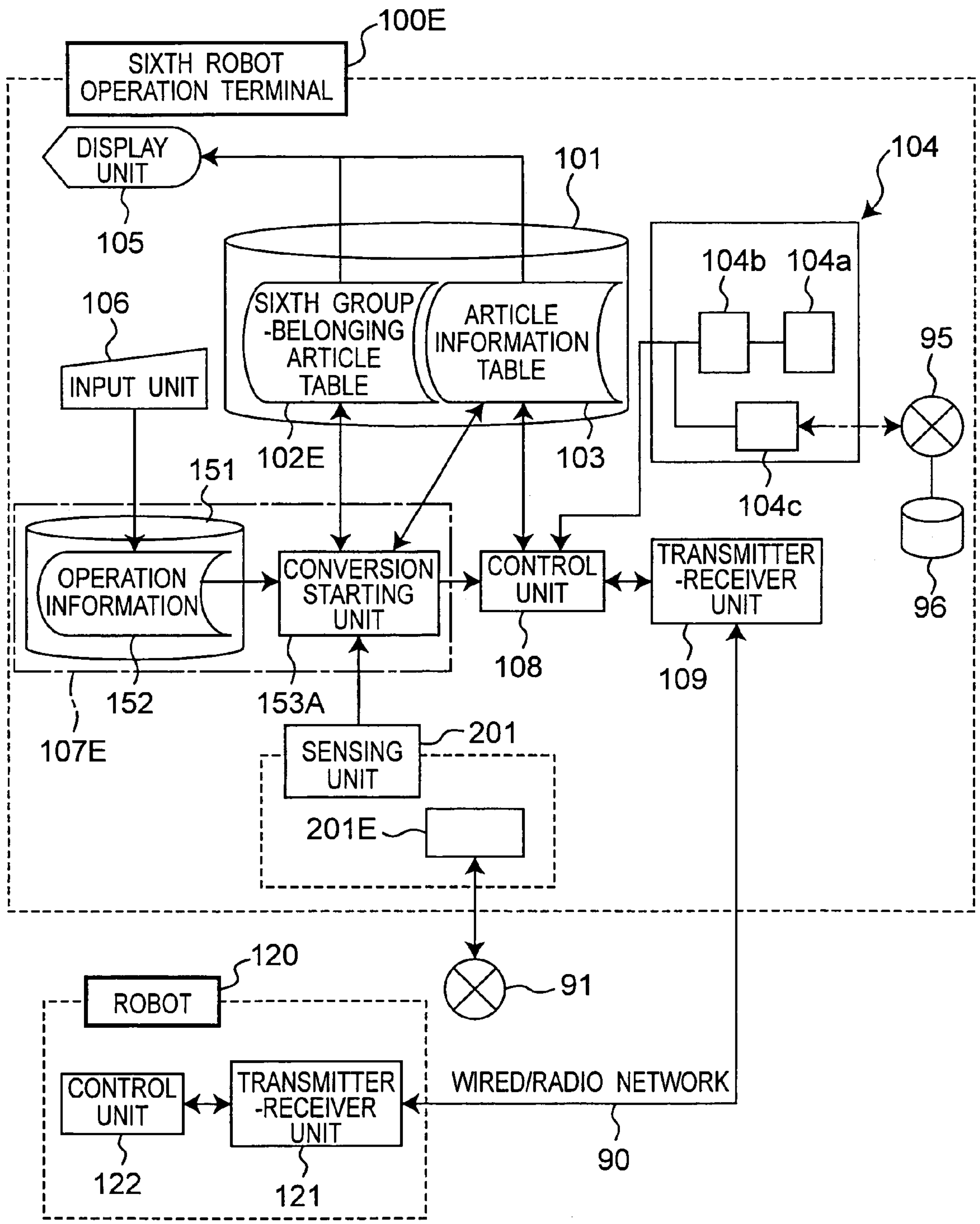
FIG. 26 is a block diagram that shows an article operation system in accordance with the sixth embodiment of the present invention.

FIG. 26 is a block diagram that shows an article operation system as one example of a living assistance system in accordance with a sixth embodiment of the present invention. In FIG. 26, the same constituent elements as those of FIG. 21 are indicated by the same reference numerals of FIG. 21.

In comparison with the fifth robot operation terminal 100D of FIG. 21, in place of the fifth group-belonging article table 102D and the fifth conversion unit 107D, a sixth robot operation terminal 100E of FIG. 26 is further provided with a sixth group-belonging article table 102E in which with respect to at least one group, operation completion conditions are added, and a sixth conversion unit 107E for converting the operation information, referring to condition information acquired from a sensing unit 201 and the information of the sixth group-belonging article table 102E. The condition information acquired from the sensing unit 201 is used for determining the timing in which the operation completion conditions are satisfied, in the sixth conversion unit 107E. The sixth conversion unit 107E is provided with a storage unit 151 which is connected to the input unit 106, for temporarily storing operation information 152 obtained from the input unit 106, and a conversion starting unit 153A, which is connected to the storage unit 151, the sensing unit 201, the sixth group-belonging article table 102E, and the control unit 108, and, based upon the operation completion condition, determines the timing by using the condition information acquired by the sensing unit 201, and converts the operation information 152 stored in the storage unit 151. The other structures are the same as those shown in FIG. 7.

FIG. 27 is a view that shows one example of information (group-belonging article information) stored in the sixth group-belonging article table 102E. In the same manner as FIG. 3, with respect to each of groups, FIG. 27 shows ID information and a name of each group, and ID information relating to articles or groups that belong to the corresponding group. Moreover, with respect to a certain group, the conditions by which an operation relating to the certain group is completed, that is, the operation completion conditions, are listed. For example, a group "G0004: company attendance" includes an article "0003: handkerchief" and a group "G0001: valuables" as the article and the group that belong thereto, and with respect to the operation completion condition, "time 7:00 if traffic jam is not so heavy, or time 6:30 if traffic jam is heavy" is given as its operation completion condition.

The operations of the article operation system relating to the sixth embodiment are basically the same as those of the first embodiment except for the operation of the sixth conversion unit 107E. Referring to flow charts of FIG. 28, the following description will discuss operations of the conversion starting unit 153A in the sixth conversion unit 107E. Here, the operation information as shown in FIG. 4 is supposed to be stored in the storage unit 151 inside the sixth conversion unit 107E. Here, the items of condition information acquired by the sensing unit 201 are time and the degree of traffic jam, and the degree of traffic jam is supposed to be "heavy". For this reason, a transmitter-receiver unit 201E capable of acquiring traffic information though the Internet 91 is used as one example of the sensing unit 201.

First, at step S1, the sixth conversion unit 107E determines whether or not the operation subject indicated by the operation information is a group. In this case, since the ID information of the operation subject is the group "G0004" (Yes, at step S11), the sequence proceeds to step S16. When the operation subject is not a group, but an article (No, at step S11), the sixth conversion unit 107E does not convert the operation information, and completes the process of the sixth conversion unit 107E.

Next, at step S16, referring to the sixth group-belonging article table 102E shown in FIG. 27, the sixth conversion unit 107E determines whether or not the timing satisfies the operation completion condition of the group forming the operation subject. Since FIG. 27 shows that the operation completion condition of the group "G0004: company attendance" is "time 7:00 if traffic jam is not so heavy, or time 6:30 if traffic jam is heavy". Here, the degree of traffic jam acquired by the sensing unit 201 is "heavy", and supposing that the time required from the operation start to the operation completion is preliminarily calculated as 30 minutes by the conversion starting unit 153A, the timing in which the operation is started (in other words, the timing which satisfies the operation completion condition) is determined by the conversion starting unit 153A as 30 minutes before time 6:30, that is, time 6:00. When the time acquired from the sensing unit 201 is "6:00", the timing which satisfies the operation completion condition is achieved so that the sequence proceeds to step S12. In the other cases, the sequence again returns to step S16. For this reason, the succeeding processes are not carried out until time 6:00.

Here, the time required from the start of the operation to the completion is calculated by the conversion starting unit 153A based upon the moving speed of the robot 120 and the moving path thereof. The moving speed of the robot 120 is almost constant, and may be preliminarily set in the conversion starting unit 153A. Moreover, with respect to the moving path of the robot 120, based upon the current position of the robot 120 and the position (specified in the article information table 103) of an article that forms the operation subject, as well as referring to map information relating to a movable range of the robot 120 including the room arrangement and the layout of furniture in a home, a technique utilized in a car navigation system that has been widely used at present may be used to find the path. When the distance of the moving path has been found, the time required from the operation start to the completion thereof is easily calculated from the moving speed of the robot 120. Here, the map information may be preliminarily stored, for example, in the storage unit 101 inside the sixth robot operation terminal 100E, or may be acquired from the outside through a communication means. Moreover, in the case when the moving speed of the robot 120 changes depending on places, for example, a relationship table between places and the moving speeds may be preliminarily set.

Next, at step S12, referring to the sixth group-belonging article table 102E shown in FIG. 27, the sixth conversion unit 107E converts the group forming the operation subject to articles or respective groups that belong to the corresponding group. FIG. 27 shows that the article "0003: handkerchief" and the group "G0001: valuables" belong to the group "G0004: company attendance". Therefore, the sixth conversion unit 107E converts the group "G0004: company attendance" to the article "0003: handkerchief" and the group "G0001: valuables" in the operation information. Thereafter, the sequence proceeds to step S13.

Next, at step S13, the sixth conversion unit 107E determines whether or not the operation information still includes any other groups as the operation subject. In this case, since the group "G0001: valuables" is still included (Yes, at step S13), the sequence returns to step S16. When no other groups are included (No, at step S13), the sixth conversion unit 107E completes the processes of the sixth conversion unit 107E.

At step S16, again, with respect to the group "G0001: valuables", the sixth conversion unit 107E determines whether or not the timing satisfies the operation completion condition of the group "G0001: valuables", and since the operation completion condition is "unconditional" (Yes, at step S16), the sequence proceeds to step S12, and referring to the sixth group-belonging article table 102E shown in FIG. 27, the sixth conversion unit 107E converts the group "G0001: valuables" to the article "0001: watch" and the article "0002: wallet".

Next, at step S13, the sixth conversion unit 107E again determines whether or not the operation information still includes any other groups as the operation subject, and since no other group is contained therein (No, at step S13), the sixth conversion unit 107E completes the processes of the sixth conversion unit 107E.

Figures 28, 29:
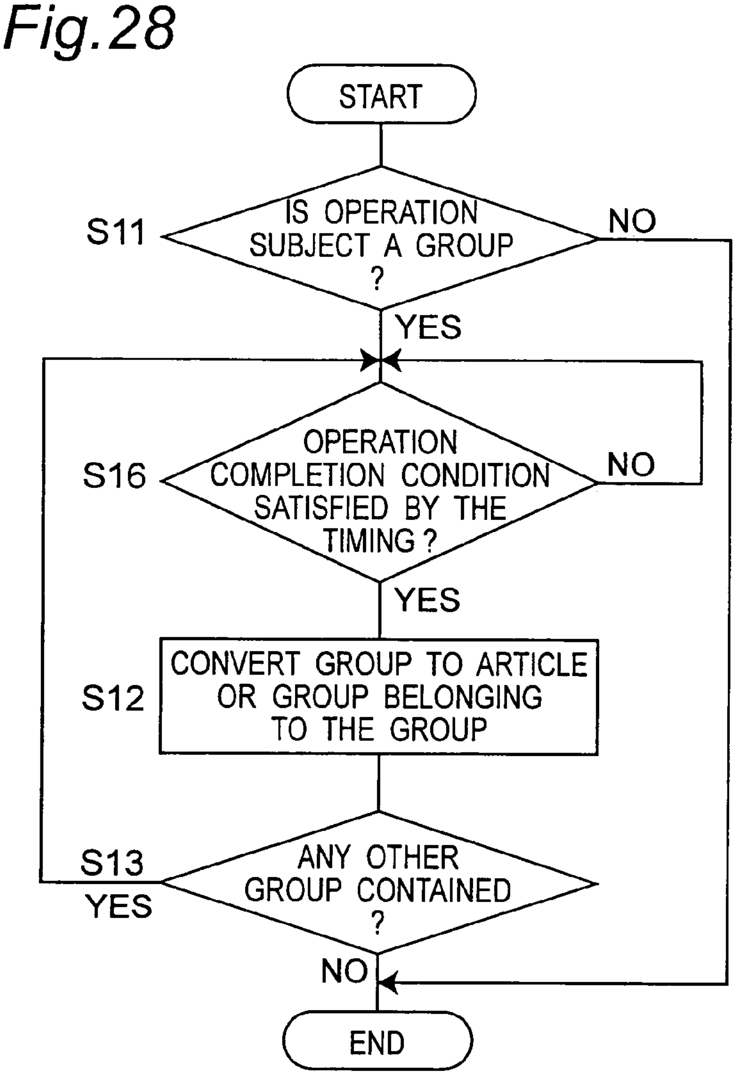
FIG. 28 is a flow chart that shows conversion processes in accordance with the sixth embodiment of the present invention.
FIG. 29 is a view that shows operation information after conversion in accordance with the sixth embodiment of the present invention.

As a result of the above-mentioned operation, the operation information of FIG. 4 is converted as shown in FIG. 29. In FIG. 29, the article "0001: watch", the article "0002: wallet", and the article "0003: handkerchief" are specified as the operation subjects, and "transfer to position (500, 500)" is specified as the contents of operations. This conversion starts executing at time 6:00, so as to satisfy the operation completion condition of the group "G0004: company attendance".

In this case, since the degree of traffic jam is supposed to be "heavy", the conversion of the operation information is carried out at time 6:00; however, in the when the degree of traffic jam is not heavy, since the operation completion condition is set at "time 7:00" so that the conversion of the operation information is carried out at time 6:30.

In the same manner as the first Embodiment, the operation information as shown in FIG. 29, which has been converted and outputted by the sixth conversion unit 107E, is given to the control unit 108. Based upon the operation information thus given, the control unit 108 generates operation commands for the robot 120 by reference to the article information table 103. These commands, generated by the control unit 108, are inputted to the control unit 122 of the robot 120 through the transmitter-receiver unit 109, the radio or wired network 90, and the transmitter-receiver unit 121. Based upon the inputted commands, the control unit 122 operates the robot 120. Since the time required from the operation start to the completion thereof is 30 minutes, the time at which the robot 120 has completed the operation is set to time 6:30 when traffic jam is heavy, and when traffic jam is not heavy, it is set to time 7:00. Thus, the operations in which the article "0001: watch", the article "0002: wallet", and the article "0003: handkerchief" are held by the robot 120, and "transported to position (500, 500)" are executed before the above-mentioned time.

As described above, in accordance with the sixth Embodiment, referring to the sixth group-belonging article table 102E, the sixth conversion unit 107E determines the timing which satisfies the operation completion condition from the condition information acquired from the sensing unit 201, and starts the conversion of the operation information in the corresponding timing. With this arrangement, the user no longer needs to take the timing in which the operation is started into consideration, and only needs to preliminarily input the operation information.

Here, in the sixth embodiment, by specifying the action schedule of the user, such as, before coming home as the operation completion condition, specific time and date can be specified so that, for example, dinner is prepared before coming home, or on a day off, the car is washed.

Here, the sixth embodiment may be executed in combination with the second to fifth embodiments. In this case, the operation completion condition as explained in the sixth embodiment, may be combined with belonging-conditions as explained in the second embodiment, selection conditions as explained in the third embodiment, operation contents with execution conditions as explained in the fourth embodiment, or operation starting conditions as explained in the fifth embodiment, and listed on the group-belonging article information. Then, step S20 in the second embodiment, that is, the sub-routine 1, or step S30 in the third embodiment, that is, the sub-routine 2, or step S40 in the fourth embodiment, that is, the sub-routine 3 may be executed after step S12. Alternatively, step S15 in the fifth Embodiment may be executed before and after step S16.

In each of the above-mentioned embodiments, operation information after the conversion, condition information obtained by the sensing unit 201, or the like may be displayed on a display unit 105. With this arrangement, the operator is allowed to see operation information to be actually given to the robot; therefore, even when an erroneous input of the operation information occurs, the erroneous input can be revised through a correcting operation input from the input unit 106. Moreover, when any piece of group-belonging article information contains recurrent data, such as, for example, a group A being included in the group A, the data may be shown on the display unit 105 together with a warning. The presence of recurrent data can be recognized by detecting the fact that processes have been carried out on the group having the same ID information a plurality of times.

In the above-mentioned respective embodiments, the group-belonging article table 102, 102A, 102B, 102C, 102D, or 102E is managed in a separate manner from the article information table 103; however, instead of this arrangement, pieces of information described on the group-belonging article table 102, 102A, 102B, 102C, 102D, or 102E as well as on the article information table 103 may be placed on a single table, and even in this case, the same operations as the respective embodiments can be obtained with the same effects.

Moreover, in the above-mentioned respective embodiments, the constituent elements, such as the input unit, the conversion unit, the storage unit that stores the group-belonging article information and the article attribute information, the display unit, and the sensing unit, are installed in a robot operation terminal; however, the present invention is not intended to be limited by this arrangement, and these constituent elements may be arranged at any place as long as they are in the article operation system, and may also be placed, for example, in a plurality of places in a scattered manner.

Furthermore, in the above-mentioned respective embodiments, the group-belonging article information and the article attribute information are respectively stored with a table format; however, the mode used for storing information is not intended to be limited to the table format, and another format may be used.

In the above-mentioned respective embodiments, explanations have been given on the assumption that a single piece of operation information is inputted; however, even when a plurality of pieces of operation information are inputted collectively, the present invention can be achieved in the same manner. By collectively inputting a plurality of pieces of information, it becomes possible to instruct a robot to carry out a sequence of actions. For example, by collectively inputting an operation instruction for carrying soiled articles in a laundry box to a clothes washer and for starting a washing process and an operation instruction for transferring the washed articles to a drying place after the washing process is completed by the clothes washer, it becomes possible to instruct a robot to carry out a sequence of actions in which, when the soiled articles in the laundry box have reached a predetermined amount, the robot carries the laundry box to the clothes washer to start the washing process, and after the washing process, the robot carries the washed articles to a drying place.

Seventh Embodiment

In a seventh embodiment of the present invention, the following description will discuss a specific structural example of an article operation system as one example of a living assistance system and examples of actions of a robot that is operated by the article operation system so as to additionally explain the article operation systems in the first to sixth embodiments.

Figure 30:
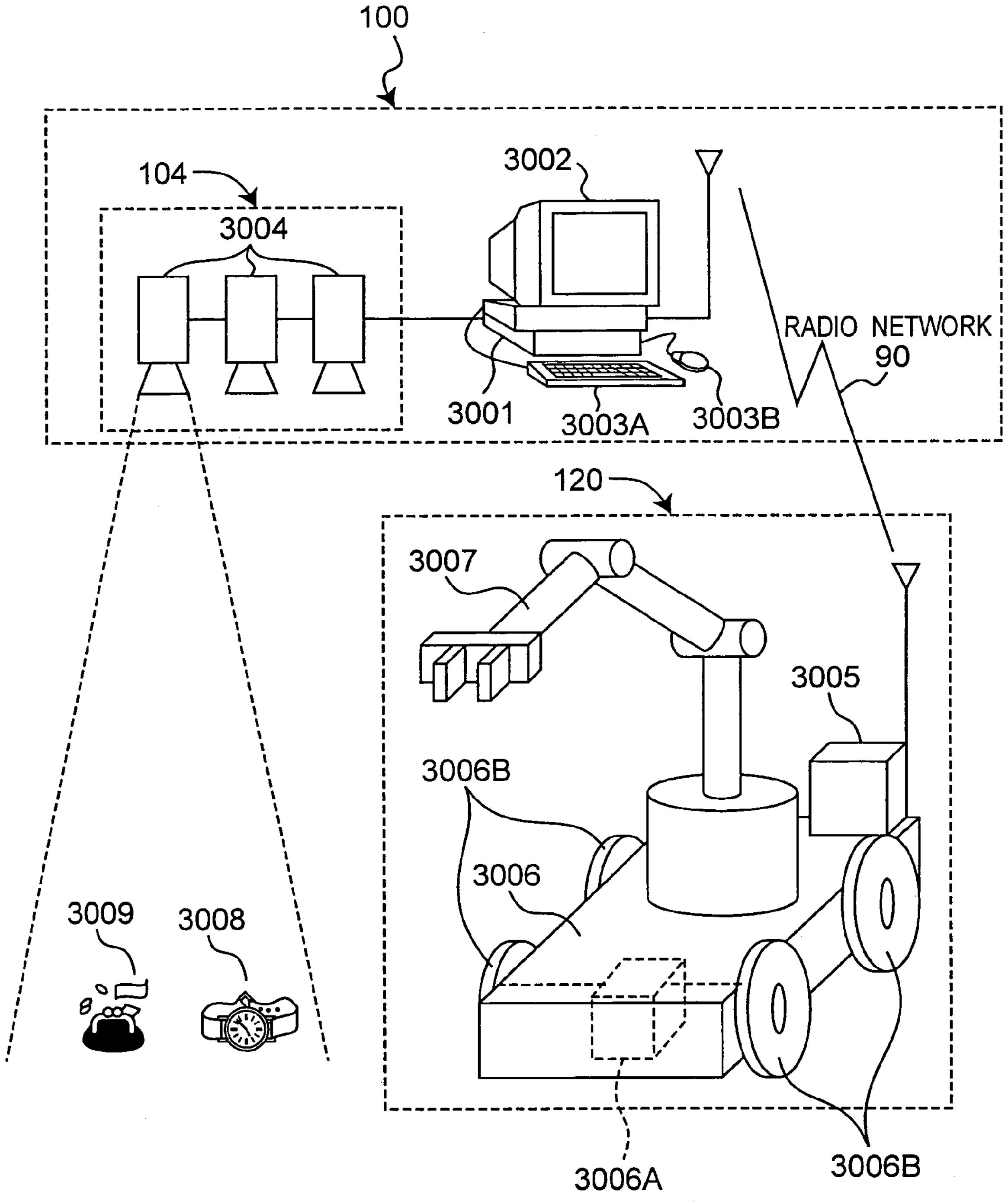
FIG. 30 is an explanatory view that shows a robot and the like that are operated by using an article operation system, which is one example of a living assistance system in accordance with a seventh embodiment of the present invention.

FIG. 30 is a view that shows the specific structural example of the article operation system in accordance with the seventh embodiment of the present invention. In FIG. 30, reference numeral 100 represents the first robot operation terminal that is a typical example of the first to sixth robot operation terminals 100, 100A, 100B, 100C, 100D, and 100E in the article operation systems (FIG. 1, FIG. 7, FIG. 11, FIG. 16, FIG. 21, and FIG. 26) explained in the first to sixth embodiments. In the first robot operation terminal 100, reference numeral 3001 represents a computer in which the storage unit 101, the conversion unit 107, the control unit 108, the transmitter-receiver unit 109, and the like of each of the article operation systems explained in the first to sixth embodiments are installed so as to execute respective processes. Reference numeral 3002 represents a display for displaying information of the computer 3001, and 3003A and 3003B represent a keyboard and a mouse through which information is inputted to the computer 3001, and these respectively correspond to one example of the display unit 105 and one example of the input unit 106 in each of the article operation systems explained in the first to sixth embodiments. Reference numeral 3004 represents a camera that is one example of the sensing unit 104 in each of the article operation systems explained in the first to sixth embodiments, and the sensing unit 104 is constituted by one or a plurality of cameras 3004.

Reference numeral 120 represents the robot of each of the article operation systems explained in the first to sixth embodiments. In the robot 120, reference numeral 3005 represents a processing unit in which the transmitter-receiver unit 121 and the control unit 122 of each of the article operation systems explained in the first to sixth embodiments are installed so as to execute respective processes. Reference numeral 3006 represents a moving carriage that is allowed to move through a controlling operation of the control unit 122 of the processing unit 3005, and 3007 represents a holding arm which is installed on a the moving carriage 3006 that has a driving device 3006A, such as a driving motor, used for driving four traveling wheels 3006B and is travel-controlled by the control unit 122, and is used for holding an article while being controlled by the control unit 122.

Reference numeral 3008 represents a watch and 3009 is a wallet, and the watch 3008 and the wallet 3009 correspond to the article "0001: watch" and the article "0002: wallet" in the article information table 103, for example, shown in FIG. 2, and these belong to the group "G0001: valuables" in the group-belonging article table 102, for example, shown in FIGS. 3, 8, and 27.

Referring to FIG. 30, the following description will discuss the seventh embodiment of the present invention. The robot operation terminal 100 has a structure in which the sensing unit 104 constructed by the camera 3004 is added to a general-use computer system constituted by the computer 3001, the display 3002, the key board 3003A, and the mouth 300B. The sensing unit 104 constructed by the camera 3004 acquires images of the respective articles, that is, images of the watch 3008 and the wallet 3009, and based upon the acquired images, information such as positions of these articles is obtained by using the method and the like as already explained in the first embodiment. The information of the articles thus obtained is recorded/updated in the article information table 103 that is recorded in a storage medium corresponding to the storage unit 101 such as a hard disk installed in the computer 3001. In this manner, for example, as shown in the article information table 103 of FIG. 2 as one example, the latest pieces of information of the article "0001: watch" and the article "0002: wallet" are recorded in the article information table 103. Here, the information of the article information table 103 may be supplied to the user through the display 3001 corresponding to the display unit 105.

The article operation systems in accordance with the above-mentioned embodiments of the present invention relate to an article operation system used for giving to a robot instructions for operating the article so that the article is operated by using the robot in a living space including habitation space and the like, such as a home, and in particular to improvements of processes of operation information that is inputted upon instructions of the operation of the article in the article operation system. The processes of operation information are explained as follows:

The user inputs the contents of operation for the robot 120 through the key board 3003A and the mouse 3003B corresponding to the input unit 106. In the computer 3001, based upon information on the group-belonging article table 102 and the article information table 103 recorded in a storage medium corresponding to the storage unit 101, such as a hard disk installed in the computer 3001, the respective processes in the conversion unit 107, the control unit 108, and the transmitter-receiving unit 109 are carried out, as has been explained in the first embodiment. Here, supposing that the article information table 103 is shown in FIG. 2 and that the group-belonging article table 102 is shown in FIG. 3, when the user inputs the group "G0001: valuables" as the operation subject and the content "transfer to the entrance" as the contents of operation through the key board 3003A and the mouse 3003B, as explained in the first embodiment, the commands for transferring the watch 3008 and the wallet 3009 to the entrance are transmitted to the robot 120.

In the robot 120, upon receipt of the above-mentioned commands, the processing unit 3005 which realizes the processes of the transmitter-receiver unit 121 and the control unit 122 in the article operation systems as explained in the first to sixth embodiments, controls the moving carriage 3006 so that the robot 120 is allowed to approach the watch 3008 and the wallet 3009, controls the holding arm 3007 so that the robot 120 is allowed to hold the watch 3008 and the wallet 3009 thereby and then travel-controls the moving carriage 3006 so that the watch 3008 and the wallet 3009 are transferred to the entrance.

Figure 31:
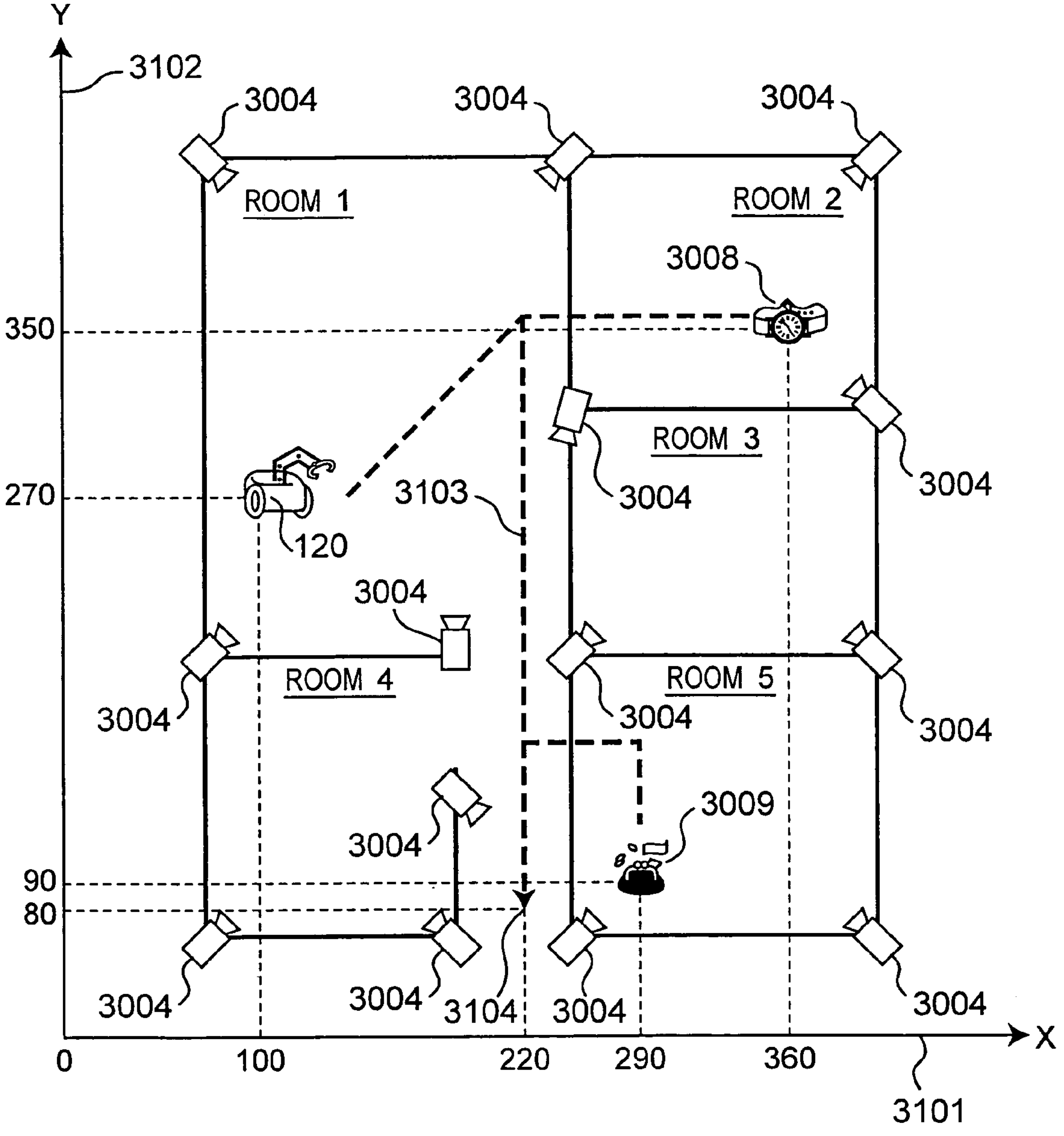
FIG. 31 is a sketch view that shows a house in which the robot, which is operated by using the article operation system in accordance with the seventh embodiment of the present invention, works.

Referring to FIG. 31, the following description will discuss operations of the robot 120 additionally.

FIG. 31 is a sketch that shows a house in which the robot 120, which is operated by using the article operation system as one example of the living assistance system in accordance with the seventh embodiment of the present invention, works. In FIG. 31, an X-axis 3101 and a Y-axis 3102 are coordinates axes used for indicating positions of articles, etc. in the house, and hereinafter, in the case when the positions of articles and the like are indicated, numeric values on the coordinates system are used. One or a plurality of cameras 3004 that form the sensing unit 104 in FIG. 30 are installed in each of the rooms of the house. The watch 3008 and the wallet 3009 are a watch 3008 and a wallet 3009 as shown in FIG. 30. The robot 120 is a robot 120 as shown in FIG. 30.

Moving paths 3103, indicated by dot lines, are paths through which the robot 120 moves, and in the above-mentioned example, the robot 120 moves through the moving path 3103, and holds the watch 3008 by the holding arm 3007, and after transporting it to the entrance 3104, it holds the wallet 3009 by the holding arm 3007, and transports it to the entrance 3104.

Referring to FIG. 31, these operations, that is, the article operation system and actions of the robot 120 that are operated by the article operation system, are explained in detail.

The many cameras 3004 corresponding to the sensing unit 104 always monitor articles inside the house shown in the sketch, and the watch 3008 and the wallet 3009, as well as the respective positions (360, 350) and (290, 90), which form information of the articles monitored in the house, are recorded/updated on the article information table 103 through the control unit 108.

When the user inputs the group "G0001: valuables" as the operation subject and the contents "transfer to the entrance 3008" as the contents of operation to the article operation system of the present invention, the following commands are transmitted to the robot 120.

1) move to position (360, 350) of "0001: watch 3008"
2) hold the article
3) move to position (220, 80) of the entrance 3104
4) release the article
5) move to position (290, 90) of "0002: wallet 3009)
6) hold the article
7) move to position (220, 80) of the entrance 3104
8) release the article As a result, the following actions are carried out. In other words, the robot 120, located at position (100, 270), moves along the moving path 3103 from a room 1 to a room 2, and at the room 2, the watch 3008, located at position (360, 350), is held by the holding arm 3007. Next, with the watch 3008 being held, the robot 120 passes through the room 2 and the room 1 to the entrance at position (220, 80) along the moving path 3103, and releases the hold of the watch 3008 by the holding arm 3007 at the entrance. Next, the robot 120 moves to a room 5 through the moving path 3103, and at the room 5, holds the wallet 3009 located at position (290, 90) by the holding arm 3007. Next, with the wallet 3009 being held, the robot 120 moves from the room 5 to the entrance through the moving path 3103, and releases the hold of the wallet 3009 by the holding arm 3007 at the entrance.

Here, in the case when the robot 120 is capable of transferring a plurality of articles, the following commands may be transmitted.

1) move to position (360, 350) of "0001: watch 3008"
2) hold the article
3) move to position (290, 90) of "0002: wallet 3009"
4) hold the article
5) move to position (220, 80) of the entrance 3104
6) release the article As a result, the following actions are carried out. In other words, the robot 120, located at position (100, 270), moves along the moving path 3103 from the room 1 to the room 2, and at the room 2, the watch 3008, located at position (360, 350), is held by the holding arm 3007. Next, with the watch 3008 being held, the robot passes through the room 2 and the room 1 to the room 5 along the moving path 3103, and at the room 5, the wallet 3009, located at position (290, 90), is further held by the holding arm 3007. Next, with the watch 3008 and the wallet 3009 being held, the robot 120 moves from the room 5 to the entrance along the moving path 3103, and releases the watch 3008 and the wallet 3009 held by the holding arm 3007 at the entrance. By reference to the group-belonging article table 102 shown in FIG. 27, the fact that a plurality of articles belong to the article "valuables" that forms the operation subject is known so that the above-mentioned determinations and command transmission are easily carried out by the article operation system. Consequently, it becomes possible to effectively give instructions to the robot 120.

In accordance with the above-mentioned commands, the robot 120 is allowed to move along the moving path 3103 and transport the watch 3008 and the wallet 3009 to the entrance 3104 as described above.

In many cases, the position of a certain article that is the operation subject may be changed by a person, etc., during the operation of the robot 120. In such cases, even when the robot 120 moves to the position of the operation subject article, it fails to find the operation subject article with the result that the operation is delayed.

In such a case, the control unit 122 of the robot 120 executes an inquiry of the position of the operation subject to the control unit 108 of the robot operation terminal 100 through the transmitter-receiving unit 121, the network 90, and the transmitter-receiver unit 109. In accordance with the article operation system, since the camera 3004 corresponding to the sensing unit 104 always monitors articles inside the house, and since the monitored information is accumulated and updated on the article information table 103 through the control unit 108, the latest article information is always stored in the article information table 103. For this reason, through the above-mentioned inquiry, the control unit 108 of the robot operation terminal 100 is allowed to access the article information table 103 so that the latest position of the operation subject article is acquired to find the corresponding position. Then, the information of the latest position of the operation subject article is transmitted to the control unit 122 of the robot 120 through the transmitter-receiver unit 109, the network 90, and the transmitter-receiving unit 121 from the control unit 108 of the robot operation terminal 100; thus, the robot 120 is moved to the latest position of the operation subject article under the control of the control unit 122 so that it becomes possible to prevent the operation of the robot 3006 from being delayed.

In each of the above-mentioned embodiments, the robot is supposed to be used in a habitation space, such as a home, etc.; however, the present invention is of course applicable to a case in which the robot is utilized in a living space other than the home, for example, space of an office; a store like a supermarket, a department store, or a convenience store; as well a hotel, a hospital, or a nursing-care facility, or the like. Moreover, in the case when the robot is utilized in a space other than the living space, for example, the present invention may be applicable to industrial fields such as a factory, a warehouse, or the like.

The article operation system of the present invention makes it possible to greatly simplify inputting processes of operation information, and also to reduce the user's time-consuming tasks such as taking the air temperature, the weather, and the like into consideration and thinking about coordinates of clothes, and is consequently effectively applied to cases in which a robot is utilized in a habitation space, such as a home, etc.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A living assistance system, which instructs a robot to carry out transferring operations on articles so as to assist life, comprising:

a first sensing unit for acquiring article attribute information that shows attributes including at least an existing position of the article;

a storage unit for, with respect to a group that is a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance.

2. The living assistance system according to claim 1, wherein the group of the group-belonging article information includes another group that belongs to the corresponding group, and is one or a plurality of collections of articles.

3. The living assistance system according to claim 1, wherein the group-belonging article information includes a belonging-condition that is attached to at least one article of the articles belonging to the group, further comprising:

a second sensing unit for acquiring belonging-condition information used for determining whether or not the belonging-condition is satisfied, and outputting the acquired condition information to the conversion unit, wherein upon converting the group to the article belonging to the group, when the belonging-condition of the article of the group specified by the operation information is not satisfied based upon the belonging-condition information acquired by the second sensing unit, the conversion unit deletes the article.

4. The living assistance system according to claim 1, wherein: the group-belonging article information includes a selection condition used for selecting one article from all or one portion of the articles belonging to the group, together with the plurality of articles belonging to the group; and with respect to the group specified by the operation information, when the selection condition is included in the group-belonging article information, the conversion unit converts the group to the article selected based upon the selection condition in the operation information.

5. The living assistance system according to claim 4, further comprising:

a second sensing unit for acquiring selection condition information used for carrying out a selection process based upon the selection condition, and outputting the acquired selection condition information to the conversion unit;

wherein upon receipt of the selection condition information from the second sensing unit, the conversion unit selects the article by reference to the selection condition information.

6. The living assistance system according to claim 1, wherein the group-belonging article information includes contents of operation and an execution condition thereof attached to the article belong to the group, the system further comprising: a second sensing unit for acquiring condition information used for determining whether or not the execution condition is satisfied, and outputting the acquired condition information to the conversion unit, wherein when the condition information outputted from the second sensing unit satisfies the execution condition attached to the article belonging to the group specified by the operation information, the conversion unit converts the operation contents specified by the operation information to the operation contents indicated by the group-belonging article information.

7. The living assistance system according to claim 1, wherein the group-belonging article information includes an operation starting condition of the group, the system further comprising: a second sensing unit for acquiring condition information used for determining whether or not the operation starting condition is satisfied, and outputting the acquired condition information to the conversion unit, wherein upon determining that the condition information outputted from the second sensing unit satisfies the operation starting condition of the group specified by the operation information, the conversion unit starts converting the operation information.

8. The living assistance system according to claim 1, wherein the group-belonging article information includes an operation completion condition of the group, the system further comprising: a second sensing unit for acquiring condition information used for determining a timing in which the operation completion condition is satisfied, and outputting the acquired condition information to the conversion unit, wherein, in the timing in which the condition information outputted from the second sensing unit satisfies the operation completion condition of the group specified by the operation information, the conversion unit starts converting the operation information.

9. The living assistance system according to claim 1, wherein the article attribute information includes as an attribute of the article at least one element selected from the group consisting of type, weight, volume and material.

10. The living assistance system according to claim 3, wherein: the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

11. The living assistance system according to claim 5, wherein: the second sensing unit acquires as the condition information at least one element selected from the group consisting of attribute information of the article, time and data, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

12. The living assistance system according to claim 6, wherein: the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

13. The living assistance system according to claim 7, wherein: the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and information indicating start or completion of a control system independent from the living assistance system.

14. The living assistance system according to claim 8, wherein: the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

15. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance and wherein the group of the group-belonging article information includes another group that belongs to the corresponding group, and is one or a plurality of collections of articles.

16. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance, wherein the group-belonging article information includes a belonging-condition that is attached to at least one article of the articles belonging to the group, further comprising:

a second sensing unit for acquiring belonging-condition information used for determining whether or not the belonging-condition is satisfied, and outputting the acquired condition information to the conversion unit, wherein upon converting the group to the article belonging to the group, when the belonging-condition of the article of the group specified by the operation information is not satisfied based upon the belonging-condition information acquired by the second sensing unit, the conversion unit deletes the article.

17. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance and wherein the group-belonging article information includes a selection condition used for selecting one article from all or one portion of the articles belonging to the group, together with the plurality of articles belonging to the group; and with respect to the group specified by the operation information, when the selection condition is included in the group-belonging article information, the conversion unit converts the group to the article selected based upon the selection condition in the operation information.

18. The living assistance system according to claim 17, further comprising:

a second sensing unit for acquiring selection condition information used for carrying out a selection process based upon the selection condition, and outputting the acquired selection condition information to the conversion unit;

wherein upon receipt of the selection condition information from the second sensing unit, the conversion unit selects the article by reference to the selection condition information.

19. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance wherein the group-belonging article information includes contents of operation and an execution condition thereof attached to the article belong to the group, the system further comprising: a second sensing unit for acquiring condition information used for determining whether or not the execution condition is satisfied, and outputting the acquired condition information to the conversion unit, wherein when the condition information outputted from the second sensing unit satisfies the execution condition attached to the article belonging to the group specified by the operation information, the conversion unit converts the operation contents specified by the operation information to the operation contents indicated by the group-belonging article information.

20. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance, wherein the group-belonging article information includes an operation starting condition of the group, the system further comprising: a second sensing unit for acquiring condition information used for determining whether or not the operation starting condition is satisfied, and outputting the acquired condition information to the conversion unit, wherein upon determining that the condition information outputted from the second sensing unit satisfies the operation starting condition of the group specified by the operation information, the conversion unit starts converting the operation information.

21. A living assistance system, which instructs a robot to carry out operations on articles so as to assist life, comprising:

a first sensing unit for acquiring article attribute information that shows attributes including at least an existing position of the article;

a storage unit for, with respect to a group that is one or a plurality of collections of the articles, storing group-belonging article information that indicates the articles that belong to the group, and successively updating the article attribute information based upon the article attribute information acquired by the first sensing unit;

an input unit through which information used for identifying the group and a position of a transfer end of the group is inputted;

a conversion unit for, referring to the information used for identifying the group inputted through the input unit and the group-belonging article information stored in the storage unit, converting the information used for identifying the group to article information that belongs to the groups; and a control unit for, with respect to a transferring operation of the converted article, while referring to the article attribute information, automatically generating operation commands for moving to the article-existing position, for holding the article, for moving to the position of the transfer end, and for placing the article, with respect to each of the articles that belong to the group, and outputting the commands to the robot, wherein based upon the operation commands outputted from the control unit, the transferring operation of the article is instructed to the robot to carry out a living assistance, wherein the group-belonging article information includes an operation completion condition of the group, and wherein the system further comprises a second sensing unit for acquiring condition information used for determining a timing in which the operation completion condition is satisfied, and outputting the acquired condition information to the conversion unit, wherein, in the timing in which the condition information outputted from the second sensing unit satisfies the operation completion condition of the group specified by the operation information, the conversion unit starts converting the operation information.

22. The living assistance system according to claim 16, wherein the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

23. The living assistance system according to claim 18, wherein the second sensing unit acquires as the condition information at least one element selected from the group consisting of attribute information of the article, time and data, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

24. The living assistance system according to claim 19, wherein the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

25. The living assistance system according to claim 20, wherein the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and information indicating start or completion of a control system independent from the living assistance system.

26. The living assistance system according to claim 21, wherein the second sensing unit acquires as the condition information at least one element selected from the group consisting of attribute information of the article, time and date, meteorological conditions or traffic information at presence or in future, an action schedule of a user of the living assistance system, type, number, total weight, or total volume of articles belonging to the group, and time elapsed after joining to the group, and information indicating start or completion of a control system independent from the living assistance system.

* * * * *

UNITED STATES PATENT AND TRADEMARK OFFICE

CERTIFICATE OF CORRECTION

PATENT NO. : 7,292,911 B2
APPLICATION NO. : 11/346538
DATED : November 6, 2007
INVENTOR(S) : Katsuji Aoki It is certified that error appears in the above-identified patent and that said Letters Patent is hereby corrected as shown below:

Title Page, Column 2, (56) References Cited:
"6,971,854 B2* 12/2005 Krakowski" should be --6,917,854 B2* 7/2005 Bayer--

Col. 37, Line 64, Claim 11:
"data" should be --date--

Col. 42, Line 64, Claim 23:
"data" should be --date--

Signed and Sealed this

Sixth Day of May, 2008

JON W. DUDAS
*Director of the United States Patent and Trademark Office*